US005737628A

United States Patent [19]
Birrittella et al.

[11] Patent Number: 5,737,628
[45] Date of Patent: Apr. 7, 1998

[54] MULTIPROCESSOR COMPUTER SYSTEM WITH INTERLEAVED PROCESSING ELEMENT NODES

[75] Inventors: Mark S. Birrittella, Chippewa Falls; Richard E. Kessler, Eau Claire; Steven M. Oberlin; Randal S. Passint, both of Chippewa Falls; Greg Thorson, Altoona, all of Wis.

[73] Assignee: Cray Research, Inc., Eagan, Mich.

[21] Appl. No.: 662,868

[22] Filed: Jun. 12, 1996

Related U.S. Application Data

[62] Division of Ser. No. 165,266, Dec. 10, 1993, Pat. No. 5,583,990.
[51] Int. Cl.$^6$ .................................................. G06F 15/76
[52] U.S. Cl. ................ 395/800.11; 364/229; 364/DIG. 1
[58] Field of Search .......................... 395/800, 200.01, 395/800.11, 800.21, 200.3; 364/229, DIG. 1

[56] References Cited

U.S. PATENT DOCUMENTS

| | | | |
|---|---|---|---|
| 4,933,933 | 6/1990 | Dally et al. | 370/60 |
| 4,980,822 | 12/1990 | Brantley et al. | 364/200 |
| 5,008,882 | 4/1991 | Peterson et al. | 370/943 |
| 5,105,424 | 4/1992 | Flaig et al. | 370/941 |
| 5,117,350 | 5/1992 | Parrish et al. | 395/425 |
| 5,134,690 | 7/1992 | Samatham | 395/200.01 |
| 5,157,692 | 10/1992 | Horie et al. | 375/38 |
| 5,170,482 | 12/1992 | Shu et al. | 395/800 |
| 5,201,044 | 4/1993 | Frey, Jr. et al. | 395/182.18 |
| 5,210,705 | 5/1993 | Chauvel et al. | 364/572 |
| 5,218,676 | 6/1993 | Ben-ayed et al. | 395/200 |
| 5,313,645 | 5/1994 | Rolfe | 395/800 |
| 5,341,504 | 8/1994 | Mori et al. | 395/800 |
| 5,383,191 | 1/1995 | Hobgood et al. | 371/112 |
| 5,390,164 | 2/1995 | Kremer | 370/16 |
| 5,475,858 | 12/1995 | Gupta et al. | 395/800 |
| 5,590,284 | 12/1996 | Crosetto | 395/200.05 |

FOREIGN PATENT DOCUMENTS

| | | |
|---|---|---|
| 0570729A2 | 4/1983 | European Pat. Off. |
| 0501524A2 | 5/1984 | European Pat. Off. |
| 88/08652 | 4/1988 | WIPO |

OTHER PUBLICATIONS

"Deadlock–Free Routing Schemes on Multistage Interconnection Networks", *IBM Technical Disclosure Bulletin*, 35, 232–233, (Dec. 1992).

Bradley R. Carlile, "Algorithms and Design: The CRAP APP Shared–Memory System", *Compcon Spring '93, San Francisco, CA*, 312–320, (Feb. 22, 1993).

William Dally, et al., "Deadlock–Free Message Routing in Multiprocessor Interconnection Networks", *IEEE Transactions on Computers*, C–36, 547–553, (May, 1987).

William Dally, "Performance Analysis of k–ary n–cube Interconnection Networks", *IEEE Transactions on Computers*, 39, 775–785, (Jun., 1990).

William Dally, "Virtual–Channel Flow Control", *IEEE*, 60–68, (1990).

Robert Gallager, "Scale Factors for Distributed Routing Algorithms", *NTC '77 Conference Record*, 2, (1978).

(List continued on next page.)

*Primary Examiner*—John E. Harrity
*Attorney, Agent, or Firm*—Schwegman, Lundberg, Woessner & Kluth, P.A.

[57] ABSTRACT

A multidimensional interconnection and routing apparatus for a parallel processing computer connects together processing elements in a three-dimensional structure. The interconnection and routing apparatus includes a plurality of processing element nodes. A communication connects at least one of the processing elements with a host system. An interconnection network connects together the processing element nodes in an X, Y, and Z dimension. The network includes communication paths connecting each of the plurality of processing elements to adjacent processing elements in the plus and minus directions of each of the X, Y, and Z dimensions.

1 Claim, 26 Drawing Sheets

OTHER PUBLICATIONS

Christopher Glass, et al., "The Turn Model for Adaptive Routing", *ACM*, 278–287, (1992).

Daniel Linder, et al., "An Adaptive and Fault Tolerant Wormhole Routing Strategy for k–ary n–cubes", *IEEE Transactions on Computers*, 40, 2–12, (Jan., 1991).

Peter Nuth, et al., "The J–Machine Network", *IEEE*, 420–423, (1992).

Domenico Talia, "Message–Routing Systems for Transputer–Based Multicomputers", *IEEE MICRO, vol. 13, No. 3, New York US*, 62–72, (Jun., 1993).

C. S. Yang, et al., "Performance Evaluation of Multicast Wormhole Routing in 2D–Torus Multicomputers", *IEEE*, 173–178, (1992).

J. Yantchev, et al., "Adaptive, Low Latency, Deadlock–Free Packet Routing for Networks of Processors", *IEEE Proceedings*, 136, 178–186, (May, 1989).

PROCESSING ELEMENT COMPONENTS

X DIMENSION SWITCH

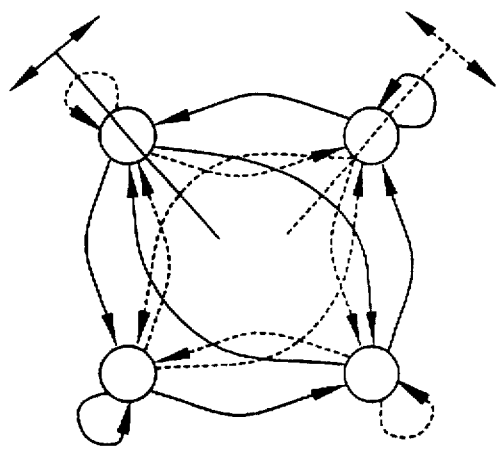
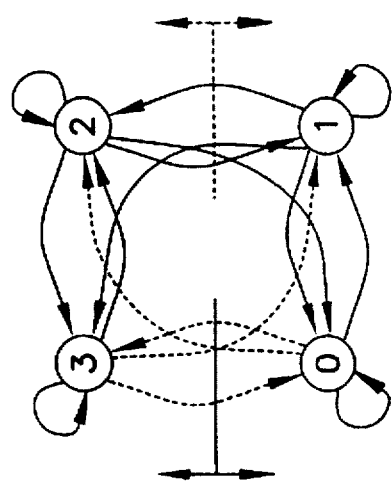
FIG. 24

MULTIPROCESSOR COMPUTER SYSTEM WITH INTERLEAVED PROCESSING ELEMENT NODES

This application is a division of U.S. patent application Ser. No. 08/165,266, filed Dec. 10, 1993 now U.S. Pat. No. 5,583,990.

FIELD OF THE INVENTION

The present invention relates to a parallel processing computer architecture.

BACKGROUND OF THE INVENTION

Computer processing speed and efficiency in both scalar and vector machines can be achieved through the use of multiprocessing techniques. By increasing the number of processors and operating them in parallel, more work can be done in a shorter period of time.

Initial attempts to increase system speed and efficiency involved the use of a limited number of processors running in parallel. For instance, an example of a two-processor multiprocessing vector machine is disclosed in U.S. Pat. No. 4,636,942, issued Jan. 13, 1987 to Chen et al. Another aspect of the two-processor machine of the Chen '942 patent is disclosed in U.S. Pat. No. 4,661,900, issued Apr. 28, 1987 to Chen et al. A four-processor multiprocessing vector machine is disclosed in U.S. Pat. No. 4,745,545, issued May 17, 1988 to Schiffleger, and in U.S. Pat. No. 4,754,398, issued Jun. 28, 1988 to Pribnow. All of the above named patents are assigned to Cray Research, Inc., the assignee of the present invention.

As the number of processors in a computing system increase, direct connection and close cooperation between all of the processors becomes impossible. As a result the programming paradigm shifts from multiprocessing to concurrent computing. In a concurrent computer a large number of processors work independently on a pieces of a concurrent program. The processors must still communicate in order to coordinate and share data but they can operate independently on that data. In concurrent computers, communication efficiency becomes critical. Communication latency must be low but at the same time packaging density must be optimized to limit the amount of processor-to-processor interconnect; in addition, it is preferable in some applications to ensure deterministic communication latency.

In response to the need to balance interconnect density against communication latency, a variety of network topologies have been developed. Most such network topologies limit the connections between processors to a relatively small number of neighbors. A large class of such topologies can be characterized as either k-ary n-cubes or as networks such as rings, meshes, tori, binary n-cubes and Omega networks which are isomorphic to k-ary n-cubes. Processors in this class of topologies communicate via a message passing protocol in which information intended for a distant processor is packetized and routed through intermediate processors to the destination processor.

Communication latency in a network such as a k-ary n-cube depends heavily on the choice of routing algorithm. Routing algorithms fall into two categories: store-and-forward routing and wormhole routing. In store-and-forward routing, a message sent from one processor to another is captured and stored in each intermediate processor before being sent on to the next processor. This means that each processor must have a fairly large buffering capacity in order to store the number of messages which may be in transit through the processor. Also, since a message must be received in its entirety before it can be forwarded, store-and-forward approaches to routing result in communication latencies which increase dramatically as a function of the number of nodes in a system. On the other hand, such an approach is amenable to the use of deadlock free algorithms which avoid deadlock by preventing or reducing the occurrences of blocking in message transfers.

In wormhole routing a message is divided into a number of smaller message packets call flits. A header flit is received by a processor and examined as to its destination. The header flit is then sent on to the next processor indicated by the routing algorithm. Intermediate flits are forwarded to the same processor soon after they are received. This tends to move a message quickly through the system. Since, however, each intermediate flit is devoid of routing information, a channel to the next processor is considered dedicated to the message until the complete message is transferred. This results in blocking of other messages which might need to use that particular channel. As more messages block, the system can become deadlocked.

A number of approaches have been offered for resolving the problem of deadlock in wormhole routing. In virtual cut-through routing, messages which are blocked are removed from the network and stored in buffers on one of the intermediate processors. Therefore, blocking in virtual cut-through networks can be avoided through the use of many of the deadlock avoidance algorithms available for store-and-forward routing. Virtual cut-through routing avoids deadlock but at the cost of the additional hardware necessary to buffer blocked messages.

Two alternate approaches for avoiding deadlock in wormhole routing communications networks are described in "Adaptive, low latency, deadlock-free packet routing for networks of processors," published by J. Yantchev and C. R. Jesshope in *IEEE Proceedings*, Vol. 136, Pt. E, No. 3, May 1989. Yantchev et al. describe a method of avoiding deadlock in wormhole routing in which the header flit, when blocked, coils back to the source node. The source node then waits for a non-deterministic delay before trying to send the message again. Yantchev et al. indicate that such an approach is likely to prove very expensive in terms of communications costs and that these costs will likely increase out of proportion as network diameter increases.

Yantchev et al. also propose an improved wormhole routing algorithm which operates to remove cycles in a network channel dependency graph by constraining routing within the network to message transfers within a series of virtual networks lain over the existing communications network. Under the Yantchev method, the physical interconnection grid is partitioned into classes according to the directions needed for message packet routing. In a two-dimensional array of processors, these classes would correspond to (+X, +Y), (−X, +Y), (+X, −Y) and (−X, −Y). Each class defines a particular virtual network; the combination of two of the virtual networks (such as (+X, +Y) and (−X, −Y)), along with a suitable deadlock free multiplexing scheme, results in a fully connected network which is deadlock-free. Yantchev et al. teach that the two-dimensional scheme can be extended to an n-dimensional network in which one virtual network is used for increasing coordinates while a second is used for decreasing coordinates. The method of virtual networks can also be extended to include adaptive routing.

The method taught by Yantchev et al. can be used to good effect in avoiding deadlock in mesh networks. The Yantchev approach is not, however, as practical for networks having wrap-around channels, such as tori. Wrap-around channels increase the number of cycles in a network. To eliminate these cycles Yantchev et al. teach that a toroidal network can be decomposed into a fully unwrapped torus equivalent consisting of two or more subarrays. Message passing is then limited to transfers within a subarray.

Such an approach, while breaking the cycles, does so at a relatively high cost. Under Yantchev, a large number of virtual channels must be allocated for each node (eight for an unwrapped two-dimensional toroid) in order to break all possible cycles. As the number of dimensions increase, the number of virtual channels needed for deadlock free routing also increases.

Dimension order, or e-cube routing is yet another wormhole approach to deadlock-free routing. In dimension order routing, an ordering of dimensions is selected and all traffic completes its routing in that order. That is, all routing is completed in one dimension before any routing is allowed in another dimension. This rigid routing scheme provides deadlock free transfers by restricting the types of turns possible in a message transfer (i.e. eliminating cycles in the acyclic mesh). Dimension order routing is described in "Deadlock-free Message Routing in Multiprocessor Interconnection Networks" published by William J. Dally and Charles L. Seitz in *IEEE Transactions on Computers*, Vol. C-36, No. 5, May 1987.

Dimension order routing provides a deterministic routing protocol but, since it only provides a single path between a source and a destination node, in mesh networks this method is not fault tolerant. In toroidal networks, the situation is not much better. A toroid has $2^n$ possible paths but all paths turn on the same n–1 nodes. Because of this, a failure in any node can cut off communication between one or more node pairs.

Each of the communications networks described above suffers limitations in its applicability to network topologies having hundreds or thousands of nodes. There is a need in the art for a communications network which resolves the above-mentioned problems in an efficient and hardware limited fashion while achieving low communications latency.

SUMMARY OF THE INVENTION

A multidimensional interconnection and routing apparatus for a parallel processing computer connects together processing elements in a three-dimensional structure. The interconnection and routing apparatus includes a plurality of processing element nodes. A communication connects at least one of the processing elements with a host system. An interconnection network connects together the processing element nodes in an X, Y, and Z dimension. The network includes communication paths connecting each of the plurality of processing elements to adjacent processing elements in the plus and minus directions of each of the X, Y, and Z dimensions.

BRIEF DESCRIPTION OF THE DRAWINGS

FIG. 24 is a diagram of naive and optimized virtual channel allocations.

DETAILED DESCRIPTION OF THE PREFERRED EMBODIMENT

In the following detailed description of the preferred embodiment, reference is made to the accompanying drawings which form a part hereof and in which is shown by way of illustration a specific embodiment in which the invention may be practiced. This embodiment is described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

INTRODUCTION

The following describes the architecture and functions a first-phase massively parallel processing (MPP) system. The MPP system typically contains hundreds or thousands of microprocessors, each accompanied by a local memory. The system is designed to support two styles of MPP programming: data parallel and message passing.

Data parallel programs, such as High Performance Fortran (HPF), are designed to provide a programmer with ease of use while still providing a good percentage of MPP performance. Message passing programs, such as parallel virtual machine (PVM) messaging, provide a higher percentage of peak MPP performance.

Cray Research, Inc., the assignee of the present application, supports both styles of programming so that customers may take a program from another vendor's MPP system and port it to a Cray Research, Inc. MPP system with a minimum amount of effort. For more information on Cray Research's MPP Programming Models, refer to the CRAY T3D Software Overview Technical Note publication number SN-2505, which is incorporated herein by reference.

The MPP system connects to a host computer system. The host system runs the software compilers for the MPP system. All programs written for the MPP system are compiled on the host system, but run in the MPP system. The host system may be, for example, any Cray Research, Inc. computer system that has an input/output subsystem model E (IOS-E). Examples of host systems include the CRAY Y-MP E series computer systems, the CRAY Y-MP M90 series computer systems, and the CRAY Y-MP C90 series computer systems. The host system may reside in the same cabinet as the MPP system. This configuration is called a single-cabinet configuration. The host system may also reside in a separate cabinet that is cabled to the MPP system cabinet. This configuration is called a multiple-cabinet configuration.

Figure 1:
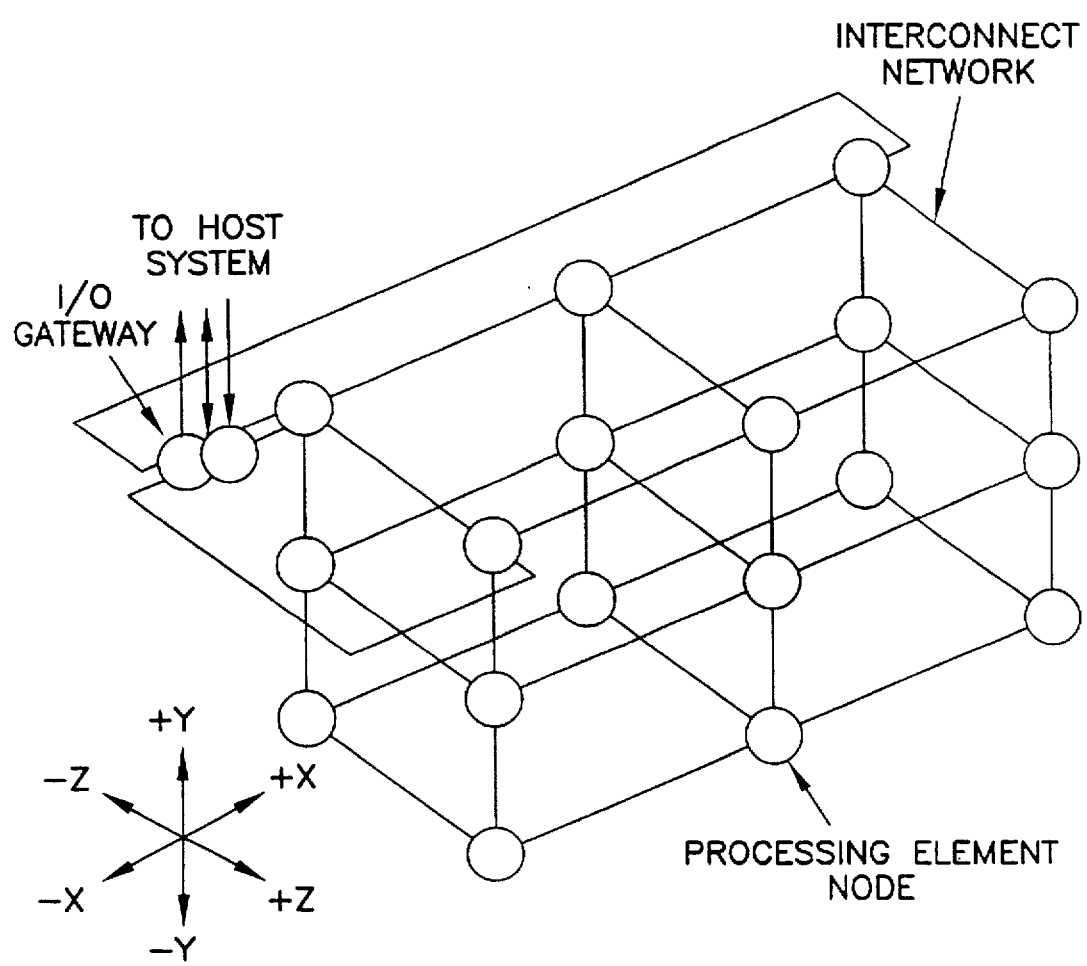
FIG. 1 is a diagram of an MPP system components.

The MPP system preferably contains four types of components: processing element nodes, the interconnect network, I/O gateways, and a clock. FIG. 1 shows a simplified model of the components of the MPP system. The following sections describe preferred components of an MPP system.

PROCESSING ELEMENT NODES

Figure 2:
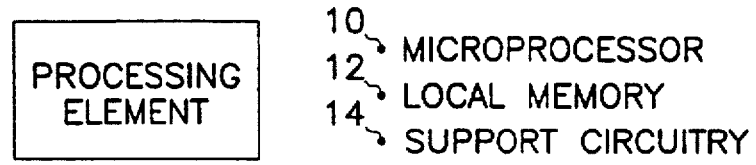
FIG. 2 is a diagram of processing element components for an MPP system.

An MPP computer system typically contains hundreds or thousands of microprocessors, each accompanied by a local memory. Each microprocessor and local memory component is called a processing element. In the MPP system, each processing element contains a microprocessor 10, local memory 12, and support circuitry 14 (refer to FIG. 2).

The microprocessor is preferably an Alpha reduced instruction set computer (RISC) 64-bit microprocessor developed by Digital Equipment Corporation. The microprocessor performs arithmetic and logical operations on 64-bit integer and 64-bit floating-point registers. The microprocessor also preferably contains an internal instruction cache memory and data cache memory that each store 256 lines of data or instructions. Each line in the instruction and data cache memory is four 64-bit words wide.

Local memory preferably comprises a dynamic random access memory (DRAM) that stores system data. A low-latency, high-bandwidth data path connects the microprocessor to local memory in a processing element.

The MPP system memory is physically distributed because each processing element contains local memory; however, the system memory is also logically shared. System memory is logically shared because the microprocessor in one processing element can access the memory of another processing element without involving the microprocessor in that processing element.

The support circuitry extends the control and addressing functions of the microprocessor. This includes performing data transfers to or from local memory.

The MPP system may contain 128, 256, 512, 1,024, or 2,048 processing elements depending on the system configuration (excluding the processing elements in the I/O gateways). The processing elements reside in processing element nodes.

Figure 3:
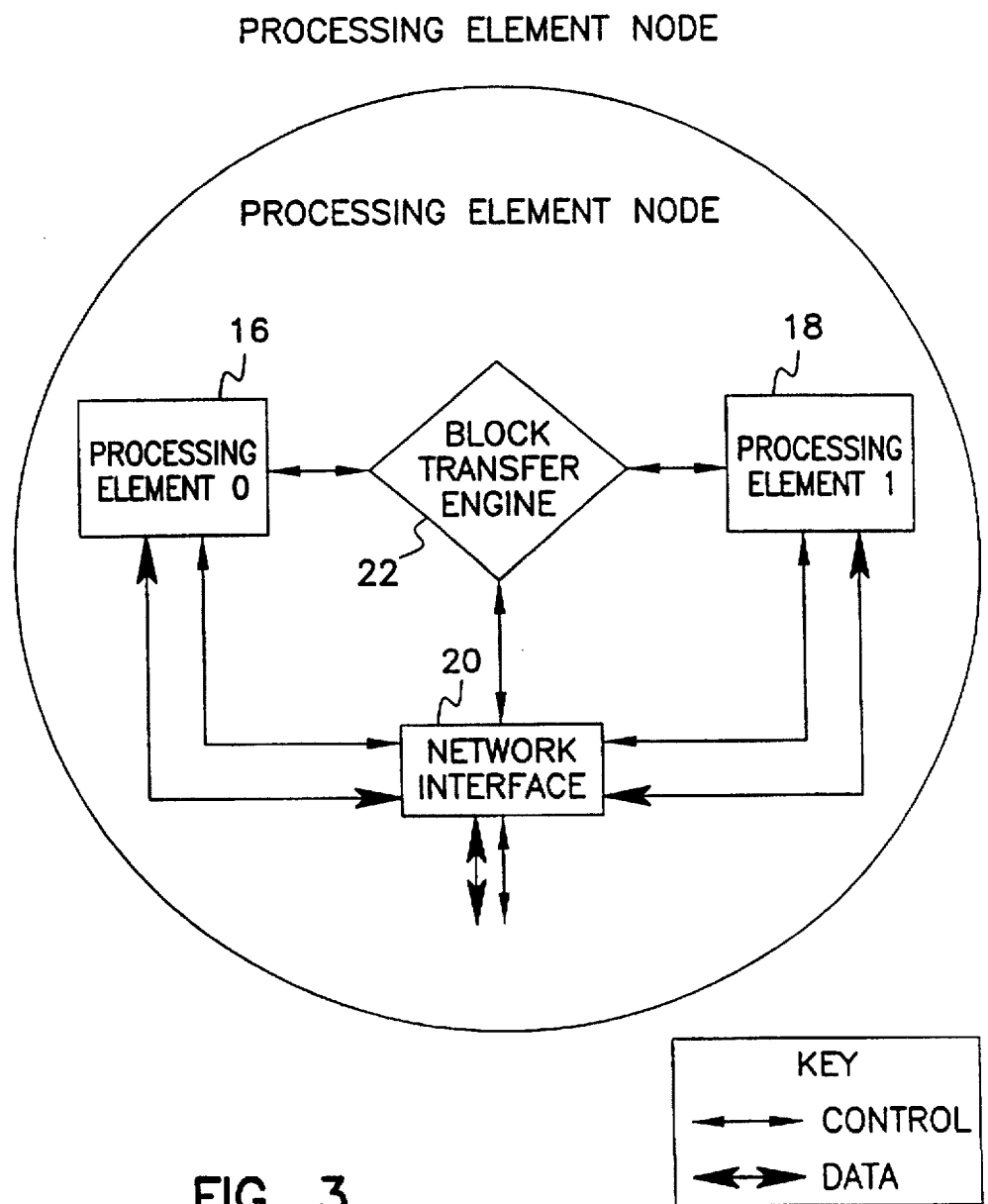
FIG. 3 is a diagram of a processing element node for an MPP system.

Each processing element node typically contains two processing elements 16 and 18, a network interface 20, and a block transfer engine 22 (refer to FIG. 3). The following paragraphs briefly describe each of these components. Processing elements (PEs) 16 and 18 in a processing element node are preferably identical but function independently. Access to block transfer engine 20 and network interface 22 is shared by the two PEs.

Network interface 20 formats information before it is sent over the interconnect network to another processing element node or I/O gateway. Network interface 20 also receives incoming information from another processing element node or I/O gateway and steers the information to PE 0 or PE 1 in the processing element node.

Block transfer engine (BLT) 22 is an asynchronous direct memory access controller that redistributes system data. BLT 22 redistributes system data between the local memory in PE 0 or PE 1 and the memory in remote PEs. BLT 22 can redistribute up to 65,536 64-bit words of data (or 65,536 4-word lines of data) without interrupting the PE.

INTERCONNECT NETWORK

The interconnect network provides communication paths among the processing element nodes and the I/O gateways in the MPP system. The interconnect network forms a three dimensional matrix of paths which connect the nodes in the X, Y, and Z dimensions (see FIG. 1).

Figure 4:
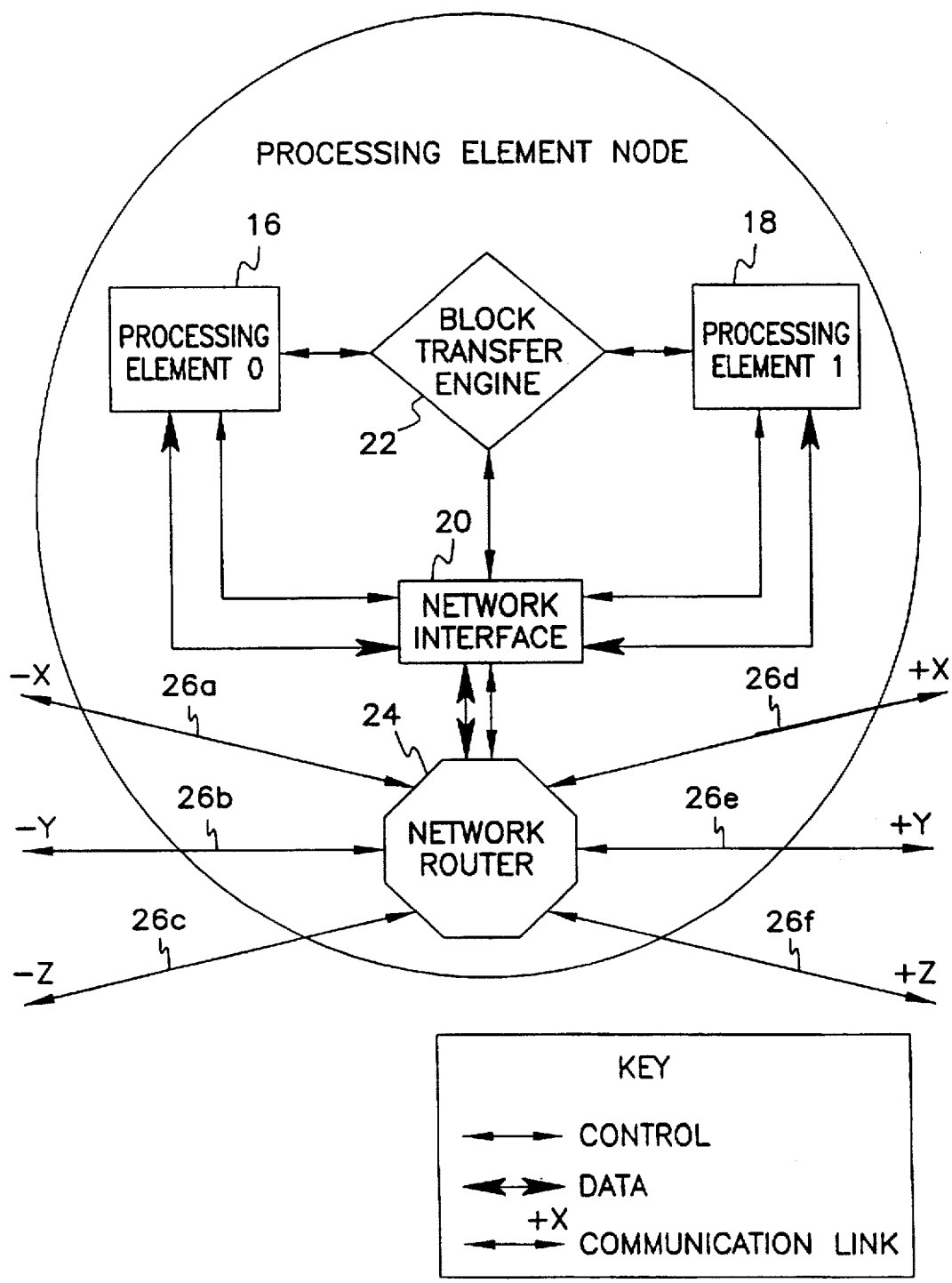
FIG. 4 is a diagram of interconnected network components for an MPP system.

The interconnect network is comprised of communication links 26a–26f and network routers 24. FIG. 4 shows how the components of the interconnect network connect to a processing element node.

The following describes the components of the interconnect network and describes characteristics of the interconnect network.

Communication Links

Figure 5:
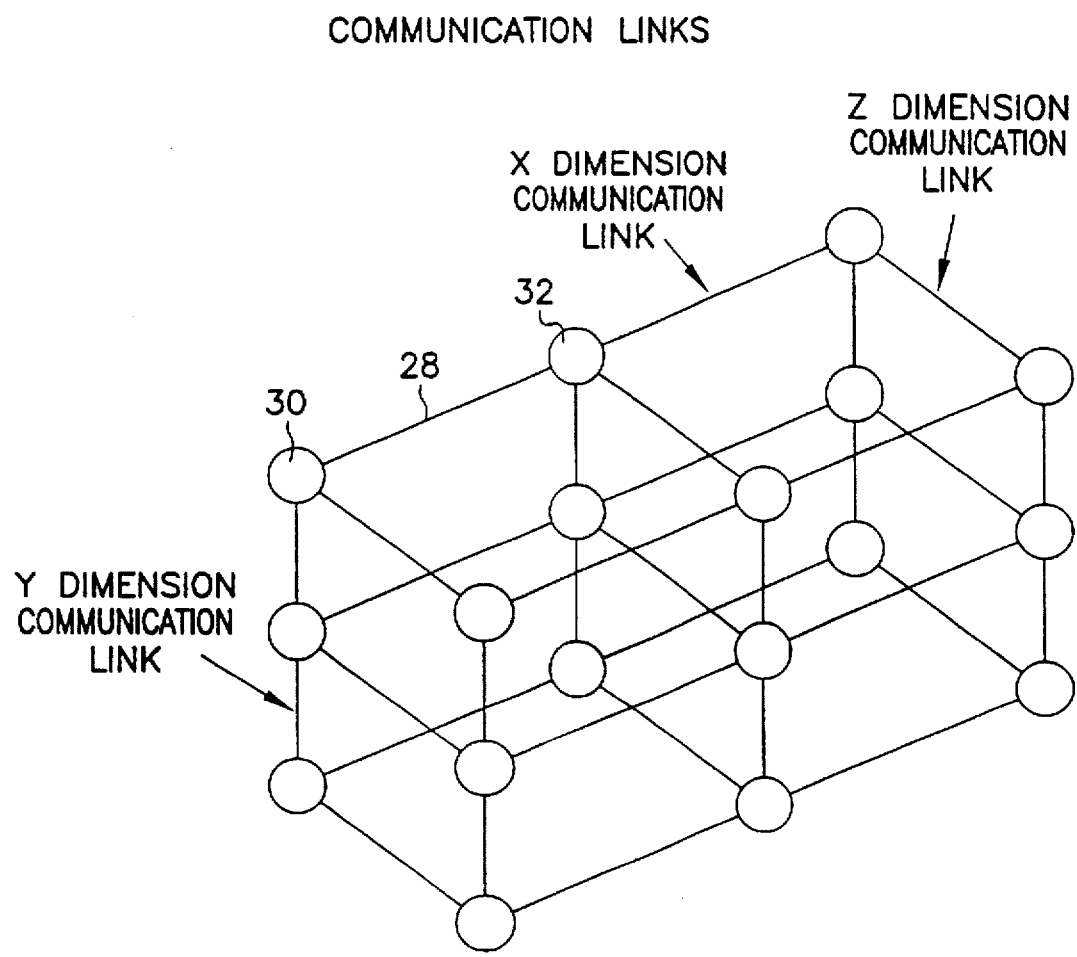
FIG. 5 is a diagram of communication links for an MPP system.

Communication links transfer data and control information between the network routers in the interconnect network. Each communication link connects two nodes in one dimension (see FIG. 5); for example, communication link 28 connects nodes 30 and 32 in the X dimension.

Figure 6:
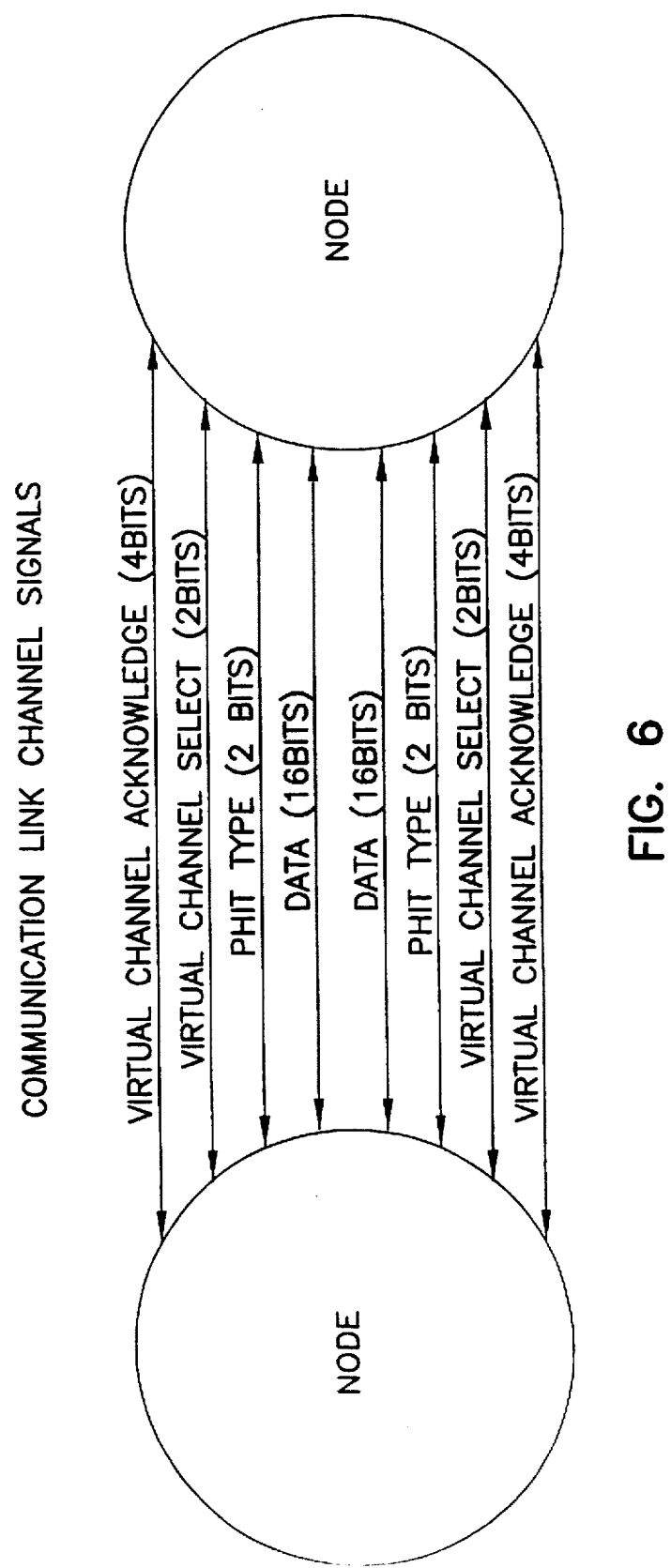
FIG. 6 is a diagram of communication link signals for an MPP system.

A communication link typically comprises two unidirectional channels. Each channel in the link preferably contains Data, Physical Unit (Phit) Type, Virtual Channel Select, and Virtual Channel Acknowledge signals. FIG. 6 shows the signals for both unidirectional channels in one communication link.

Data Signals

Each channel typically contains 16 Data signals. Data signals preferably carry two types of information: requests or responses. Requests contain information that request a node to perform an activity. For example, a source node may send a request to a destination node to read data from memory in the destination node. This request is sent over one channel in the communication link.

Responses contain information that is the result of an activity. For example, after receiving a request for read data, a destination node sends the response back to the source node. The response contains the read data.

Requests and responses preferably must be logically separated. This is preferably done by providing separate buffers for requests and responses. These buffers are used to create virtual channels.

Phit Type Bits

A phit is the amount of information that can be placed on a data channel in one clock period. In the MPP system described in the present specification, a phit is 16 bits in size.

Each channel preferably contains two phit type bits that are controlled by the node sending information over the channel. These bits indicate what type of phit is on the Data signals. Table 1 lists the definitions of the least significant bit (LSB) and most significant bit (MSB) of the phit type bits. (More information on packets is provided at the end of this subsection).

TABLE 1

Phit Type Bit Definitions

| MSB | LSB | Data Signals Contain |
|---|---|---|
| 0 | 0 | No information |
| 0 | 1 | Packet routing tag phit |
| 1 | 0 | Packet phits |
| 1 | 1 | Last phit of packet |

Virtual Channel Signals

The virtual channel signals are used to control which virtual channel the data will use. A virtual channel is created when request and response information transfers over the same physical communication link but is stored in separate buffers. The virtual channel signals include the virtual channel select bits and the virtual channel acknowledge bits.

There are two virtual channel select bits. These bits indicate which virtual channel buffer in the receiving node the information will be stored in. Table 2 shows the definitions of the virtual channel select bits.

TABLE 2

Virtual Channel Select Bit Definitions

| MSB | LSB | Definition | Name |
|---|---|---|---|
| 0 | 0 | Request buffer 0 | Virtual channel 0 |
| 0 | 1 | Request buffer 1 | Virtual channel 1 |
| 1 | 0 | Response buffer 0 | Virtual channel 2 |
| 1 | 1 | Response buffer 1 | Virtual channel 3 |

The most significant bit of the virtual channel select bits indicates if the information on the Data signals is a request or a response. When set to 0, this bit indicates the information is a request. When set to 1, this bit indicates the information is a response.

The least significant bit of the virtual channel select bits indicates which of the two request or two response buffers the information on the Data signals will be stored in. When set to 0, this bit indicates the information will be stored in buffer 0. When set to 1, this bit indicates the information will be stored in buffer 1.

There are four virtual channel acknowledge bits. Each virtual channel buffer controls one of the virtual channel acknowledge bits. For example, virtual channel buffer 2 controls bit $2^2$ of the virtual channel acknowledge bit. The node receiving information sets the appropriate virtual channel acknowledge bit to 1 while the node empties the virtual channel buffer and sends the information to another node or a PE. The node resets the virtual channel acknowledge bit to 0 after the virtual channel is empty and the data has been sent to another node or a PE.

Torus Interconnect Topology

The interconnect network is connected in a bidirectional torus. A torus contains communication links that connect the smallest numbered node in a dimension directly to the largest numbered node in the same dimension. This type of connection forms a ring where information can transfer from one node, through all of the nodes in the same dimension, and back to the original node.

Figure 7:
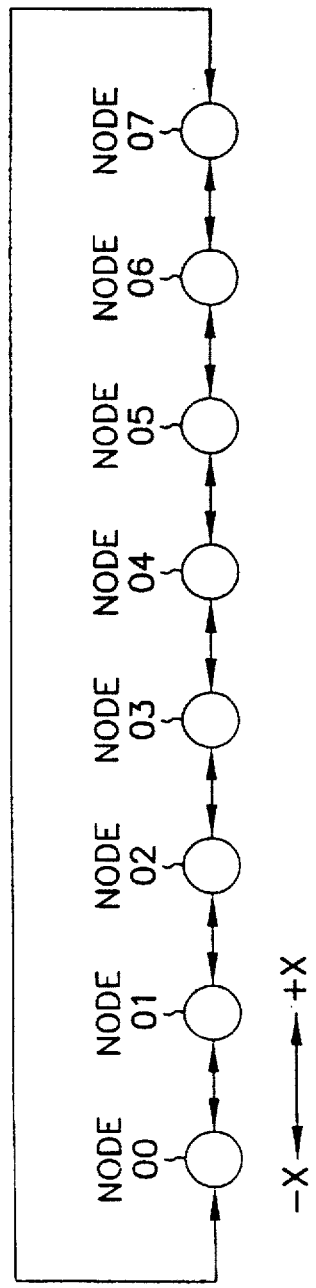
FIG. 7 is a diagram of a one dimensional torus network.

FIG. 7 shows a one dimensional torus network in the X dimension. Information can transfer from node 00, through all of the nodes, and back to node 00 in a circular fashion. Each node has a communication link in both the plus and minus direction of the X dimension.

Torus networks offer several advantages for network communication. One advantage is speed of information transfers. For example, in FIG. 7, node 07 can communicate directly with node 00 instead of sending information through all of the nodes in the X dimension. Another advantage of the torus network is the ability to avoid bad communication links. For example, in FIG. 7, if node 00 cannot transfer information directly to node 01 due to a bad communication link, node 00 can still communicate with node 01 by sending the information the long way around the network through the other nodes in the X dimension.

Figure 8:
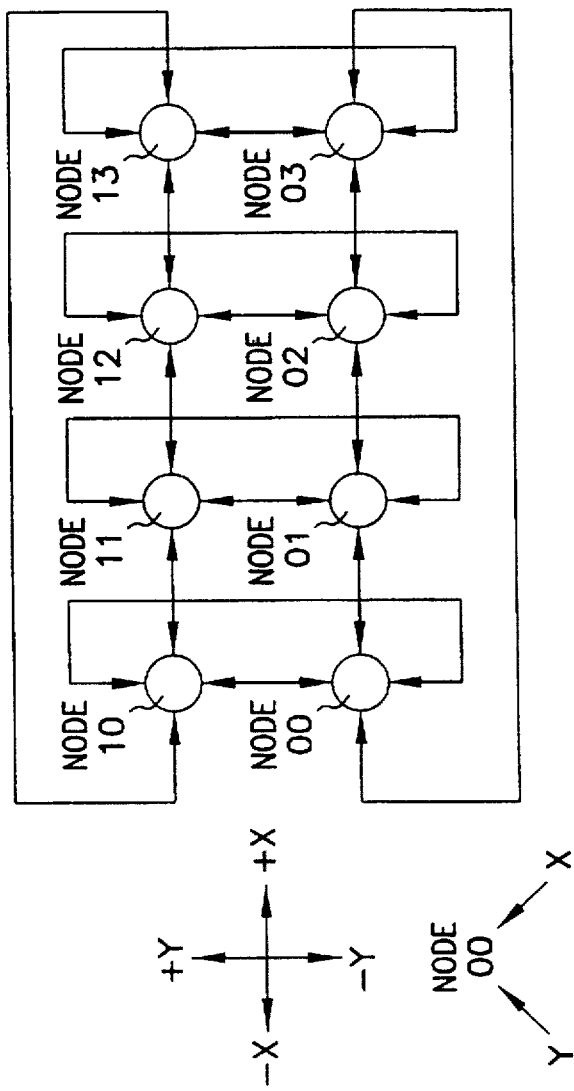
FIG. 8 is a diagram of a two dimensional torus network.
Figure 9:
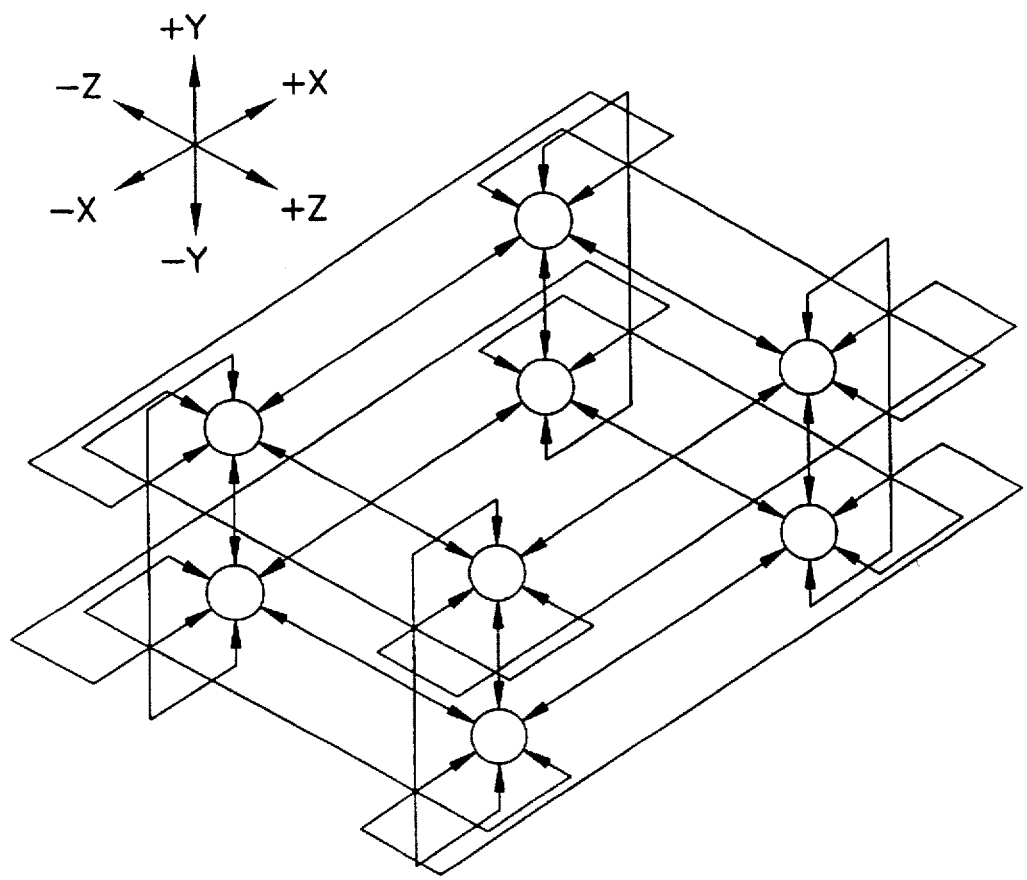
FIG. 9 is a diagram of a three dimensional torus network.

FIG. 8 shows a two dimensional torus network in the Y and X dimensions. Each node has communication links in both the plus and minus directions of the Y and X dimensions. FIG. 9 shows a three dimensional torus network in the Z, Y, and X dimensions. Each node has communication links in both the plus and minus directions of the Z, Y, and X dimensions.

Several of the diagrams in this specification show three dimensional network connections. For clarity, the communication link that completes the torus in each dimension is not shown. It is important to remember that, although not shown in the diagrams, this communication link is present.

Interleaving

The nodes in the interconnect network are preferably interleaved. Interleaving is the physical placement of nodes so that the maximum wiring distance between nodes is minimized.

Figure 10:
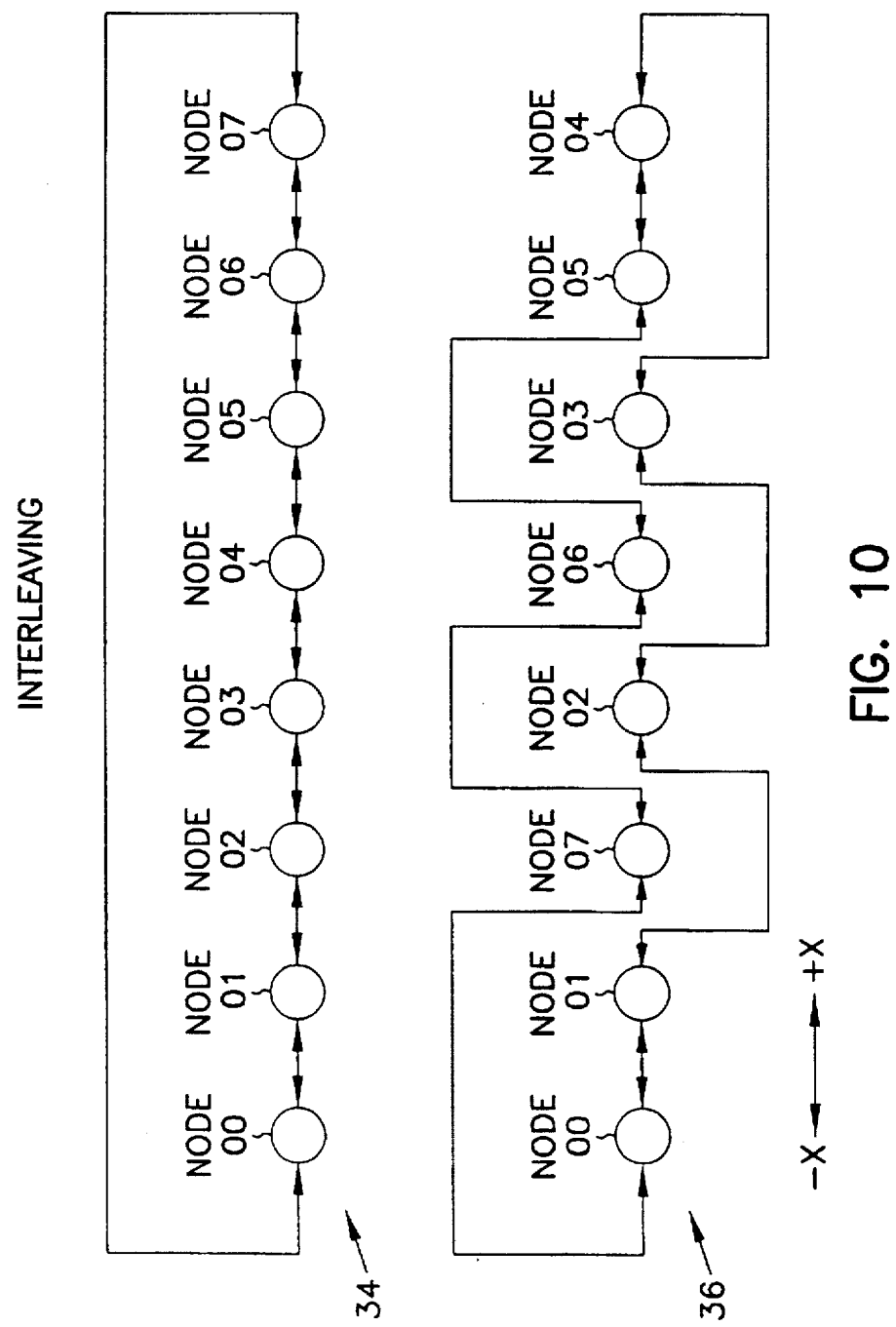
FIG. 10 is a diagram of interleaving processing nodes within an MPP system.

FIG. 10 shows two one-dimensional torus networks. The eight nodes in upper network 34 are not interleaved. The eight nodes in lower network 36 are interleaved. In the interleaved network (also called a folded torus network), the physical length of the longest communication link is shorter than the physical length of the longest communication link in the non-interleaved network. The X and Z dimensions of the network are interleaved. This minimizes the length of the physical communication links (wires) in the MPP system.

Several of the diagrams in this specification contain drawings of three dimensional interconnect networks. For clarity, the communication links are shown logically and do not show the interleaving. It is important to remember that although not shown, the nodes in the network are physically interleaved in the preferred embodiment.

Dimension Order Routing

When a node sends information to another node, the information may travel through several communication links in the network. Each transfer of information over a communication link is referred to as a hop. After information leaves a node, it typically travels through the network in the X dimension first, then through the Y dimension, and finally through the Z dimension. When finished moving through the communication links in the Z dimension, the information arrives at the destination node. This method of information travel is called dimension order routing.

Figure 11:
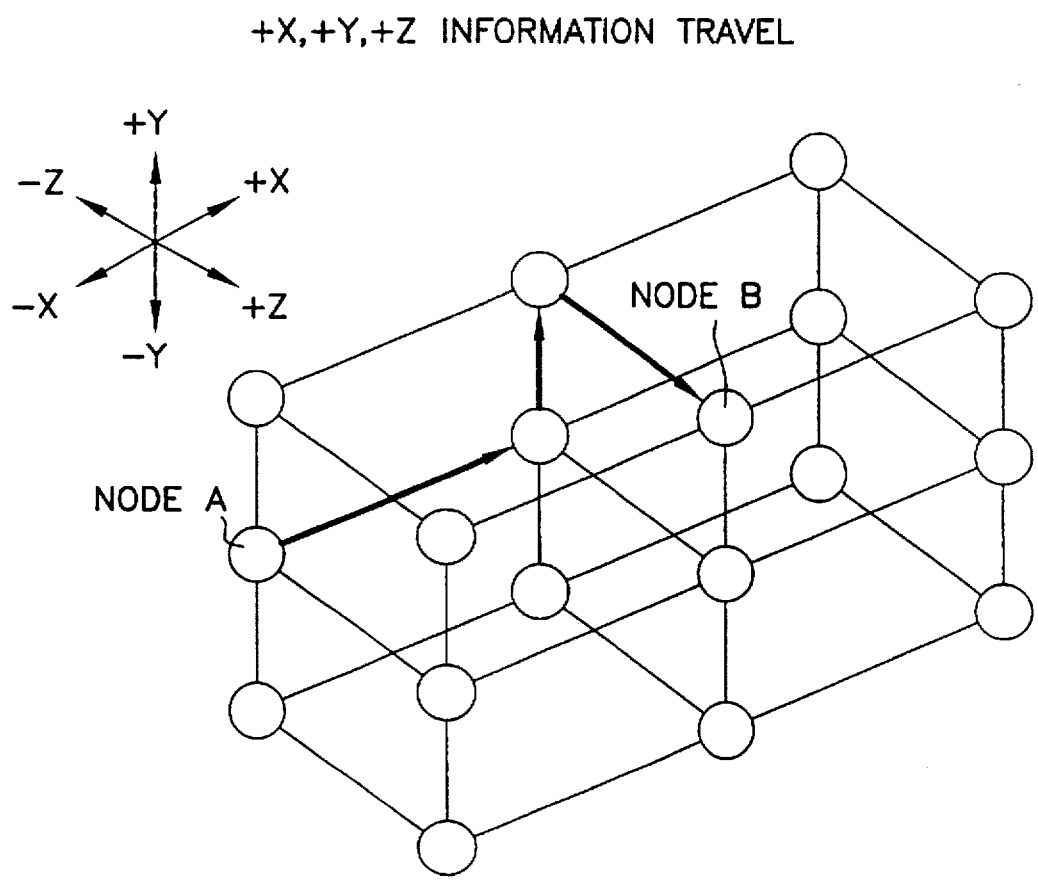
FIG. 11 is a diagram of +X, +Y, and +Z dimension information travel within an MPP system.

For example, if node A shown in FIG. 11 sends request information to node B, the information first travels one hop in the +X direction. Since the information does not need to travel any farther in the X dimension, it switches direction to the Y dimension. After completing one hop in the +Y direction, the information switches direction to the Z dimension and completes one hop in the +Z direction. After completing one hop in the +Z direction, the request information arrives at node B.

Figure 12:
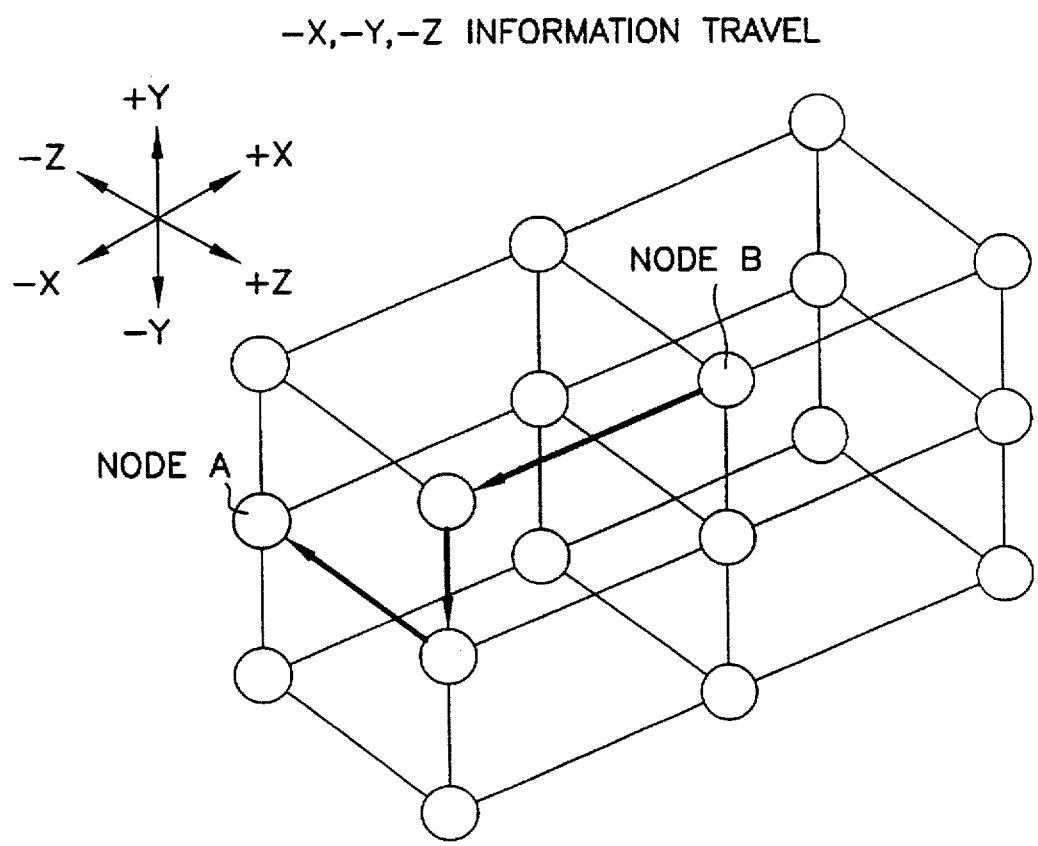
FIG. 12 is a diagram of –X, –Y, and –Z dimension information travel within an MPP system.

Information does not always travel in the positive direction of a dimension. For example, of node B in FIG. 12 sends response information to node A, the information completes on hop in the −X direction and then changes direction into the Y dimension. The information completes one hop in the −Y direction before changing direction into the Z dimension. After completing one hop in the −Z direction, the response information arrives at node A.

Figure 13:
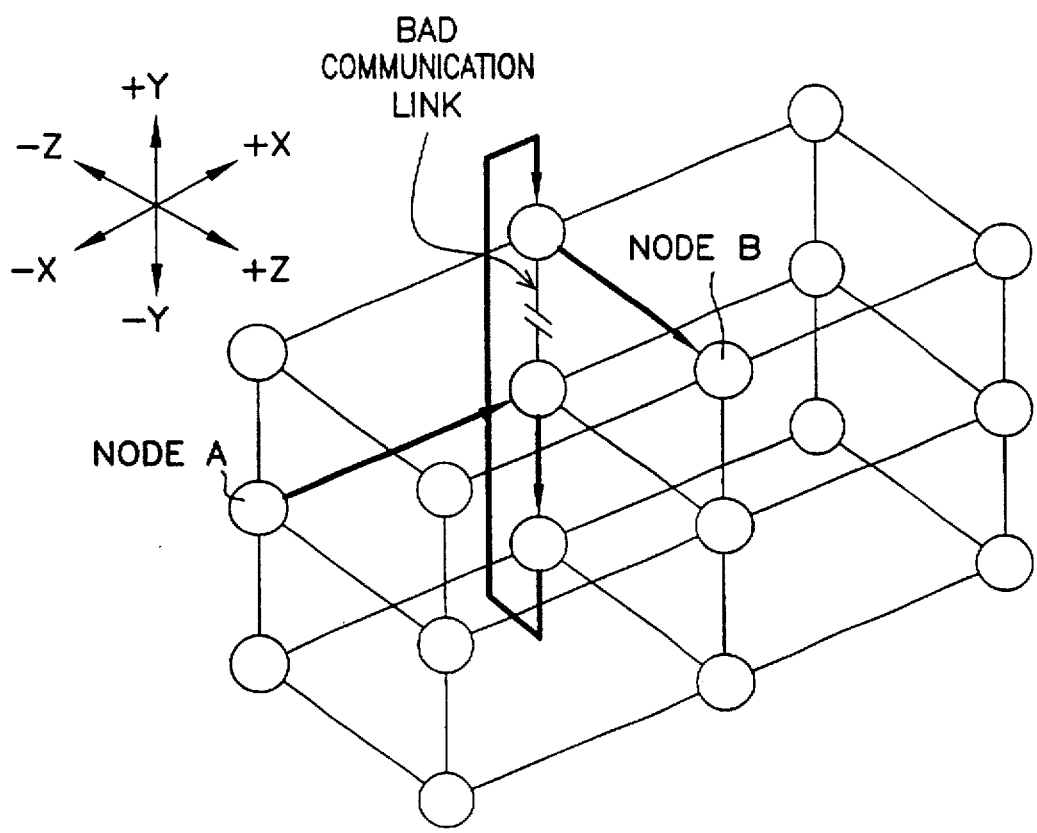
FIG. 13 is a diagram of information travel within an MPP system for avoiding a bad communication link in the Y dimension.

Because information can travel in either the positive or negative direction of a dimension, bad communication links can be avoided. For example, if node A in FIG. 13 sends information to node B, the information completes one hop in the +X direction and then switches direction into the Y dimension. Consider, for example, that due to a bad communication link, the information cannot complete a hop in the +Y direction. Instead, the information may be routed so it completes two hops in the −Y direction and travels the long way around the torus in the Y dimension. After switching directions into the Z dimension, the information completes one hop in the +Z direction and arrives at node B.

An example of a system for information routing is described in patent application Ser. No. 07/983,979 filed Nov. 30, 1992 and entitled "DIRECTION ORDER ROUTING IN MULTIPROCESSING SYSTEMS," now U.S. Pat. No. 5,533,198 which is incorporated herein by reference.

Virtual Channels

A virtual channel is created when request and response information travels over the same physical communication link, but is stored in different buffers. The MPP system contains four virtual channel buffers (see Table 3).

TABLE 3

| Virtual Channel Buffers | |
|---|---|
| Buffer Name | Definition |
| Virtual channel 0 | Request buffer 0 |
| Virtual channel 1 | Request buffer 1 |
| Virtual channel 2 | Response buffer 0 |
| Virtual channel 3 | Response buffer 1 |

The virtual channel buffers prevent two types of communication deadlock conditions that may occur in the interconnect network. The following describes these conditions.

Without the virtual channel buffers, a communication deadlock condition may occur if two nodes simultaneously transfer request or response information to each other. To prevent this condition from occurring, the MPP system contains two types of buffers: request buffers and response buffers. These buffers provide separate destination buffers for request and response information.

Also without the virtual channel (VC) buffers, a communication deadlock condition may occur if all of the nodes in one dimension send request or response information to the next node in the dimension at the same time. For example, a deadlock condition may occur if all of the nodes in the X dimension send request information to the next node in the +X direction at the same time. To prevent this condition from occurring, the MPP system preferably contains two request buffers and two response buffers (see Table 3). The buffers used when information travels through the network are determined by the dateline communication link. The dateline communication link is one communication link in each dimension that software designates as the dateline communication link.

When information travels through a dimension, if the information will at some time use the dateline communication link in that dimension, the information always uses request buffer 1 or response buffer 1. If, when traveling through a dimension, the information never uses the dateline communication link in that dimension, the information always uses request buffer 0 or response buffer 0.

Figure 14:
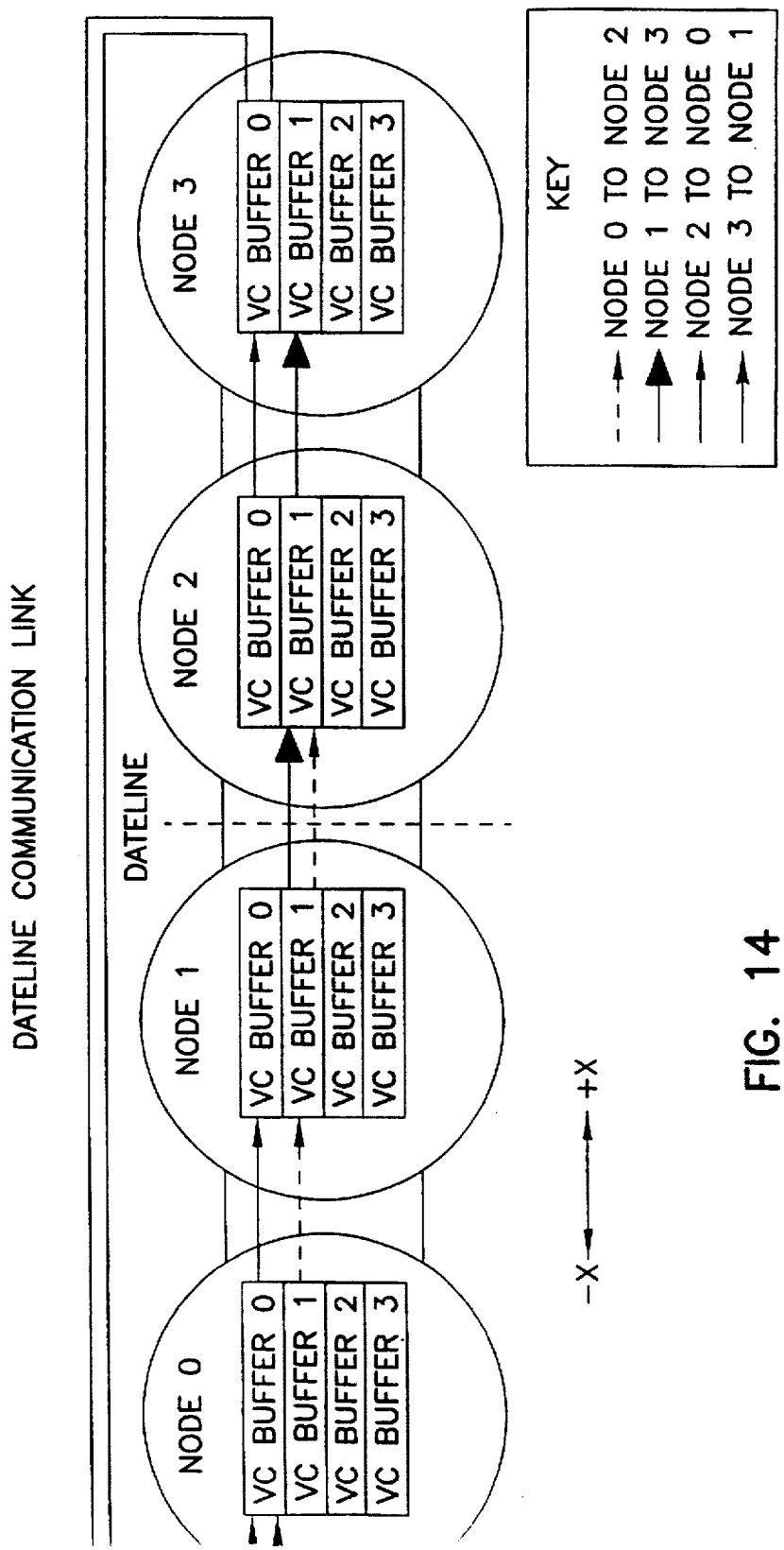
FIG. 14 is a diagram of a dateline communication link within an MPP system.

For example, FIG. 14 shows four nodes in the X dimension. Each node is transferring request information to the node that is 2 hops away in the +X direction. The dateline communication link is the communication link that connects nodes 1 and 2. The request information that transfers from node 0 to node 2 and the request information that transfers form node 1 to node 3 will at some time use the dateline communication link. Because of this characteristic, this request information uses virtual channel buffer 1 (request buffer 1).

The request information that transfers from node 2 to node 0 and the request information that transfers from node 3 to node 1 will never use the dateline communication link. Because of this characteristic, this request information uses virtual channel buffer 0 (request buffer 0). After selecting a communication link to be the dateline communication link, software sets the X VC bit of each entry in the routing tag look-up tables to the appropriate value when generating the tables. The X VC bit is used as the least significant bit of the virtual channel select bits in a communication link (see Table 2).

Packets

Figure 15:
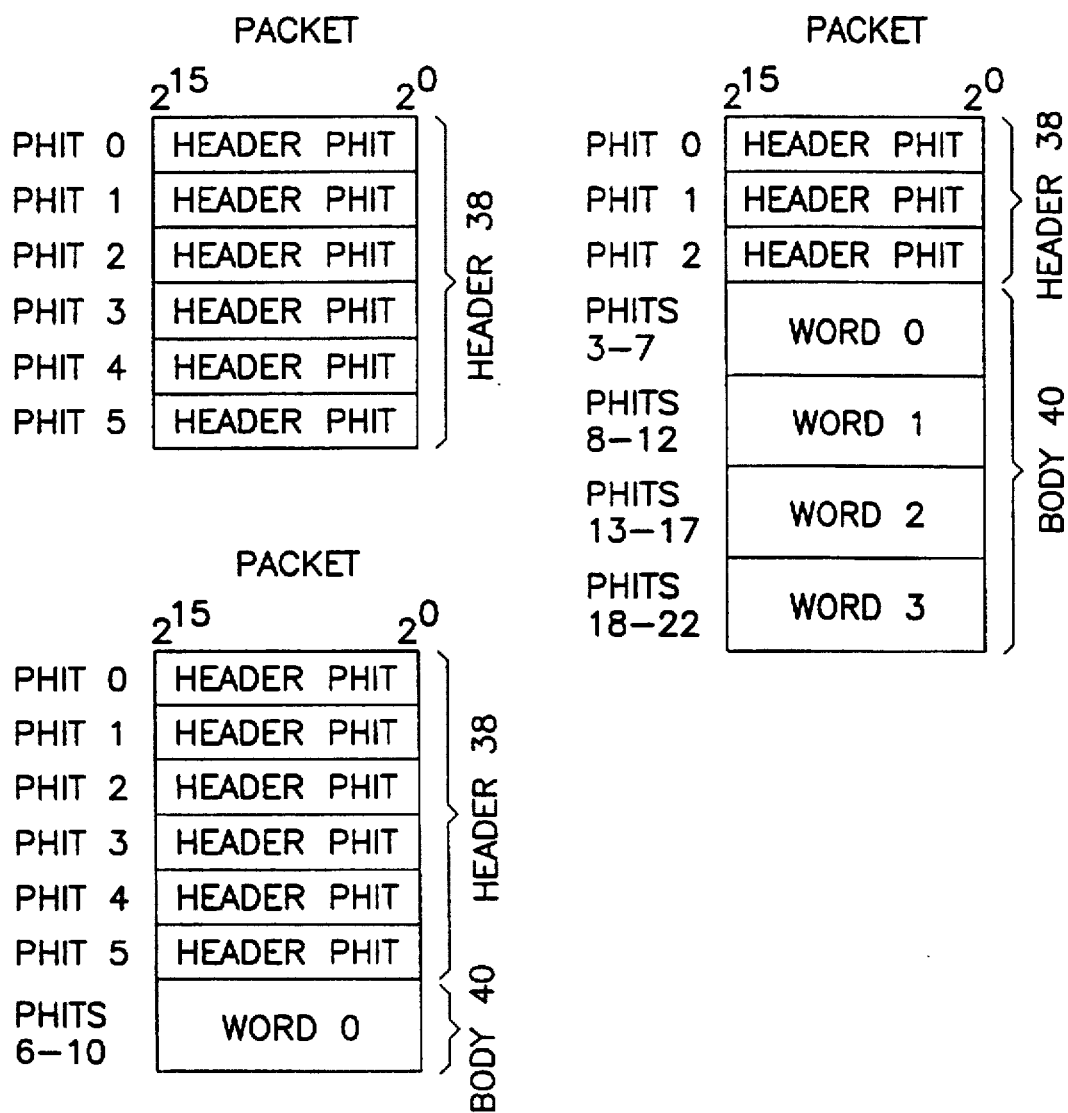
FIG. 15 is a diagram of generic packet formats for information within an MPP system.

All information transfers over the Data signals in a communication link (see FIG. 6) in the form of a packet. A packet contains two parts: a header 38 and body 40 (see FIG. 15). The header and body have variable lengths and transfer over the communication link one 16-bit phit at a time.

Every packet preferably contains a header. The header contains routing information that steers the packet through the network, destination information that indicates which PE will receive the packet, and control information that instructs the PE that receives the packet to perform an operation. The header may also contain source information that indicates which PE created the packet and may contain memory address information.

A packet may or may not contain a body. The body of a packet contains one 64-bit word or four 64-bits words of system data. For example, the body of a read response packet contains one or four words of read data.

Network Routers

Figure 16:
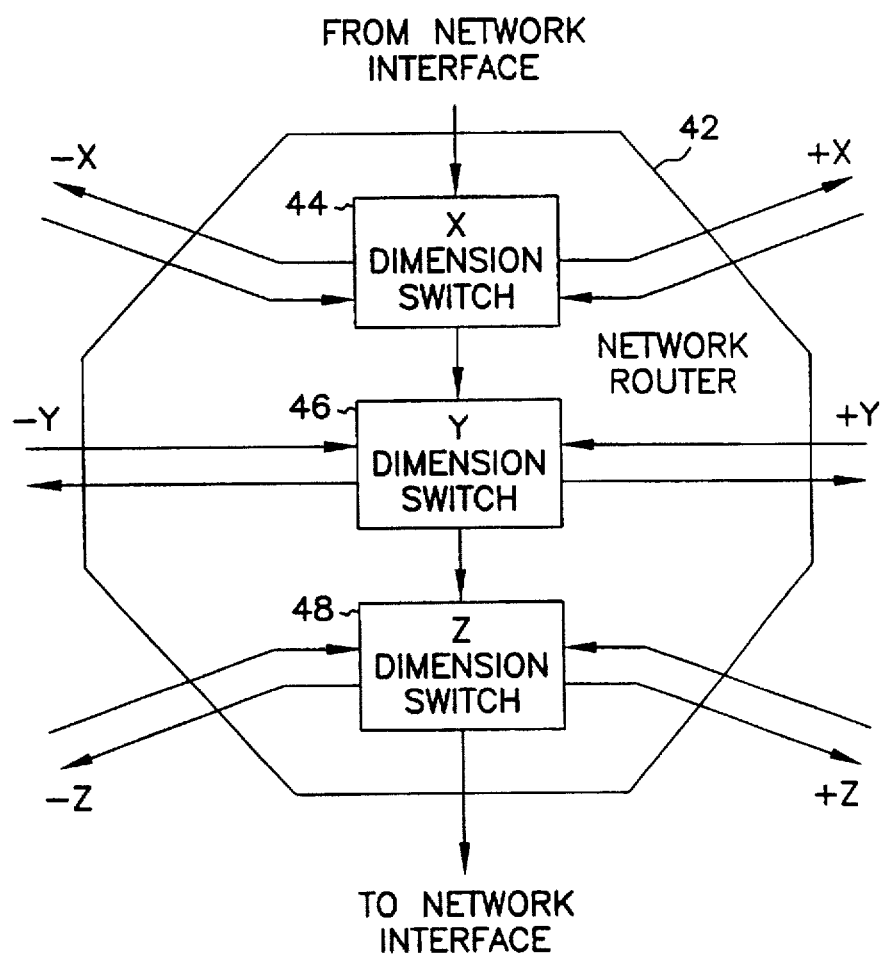
FIG. 16 is a diagram of a processing element network router for an MPP system.

The network routers transfer packets through the communication links in the interconnect network. There are typically two types of network routers: processing element network routers and I/O gateway network routers. The processing element network routers preferably contain three components: an X dimension switch 44, a Y dimension switch 46, and a Z dimension switch 48. FIG. 16 shows the flow of packet information through a processing element network router 42.

Figure 17:
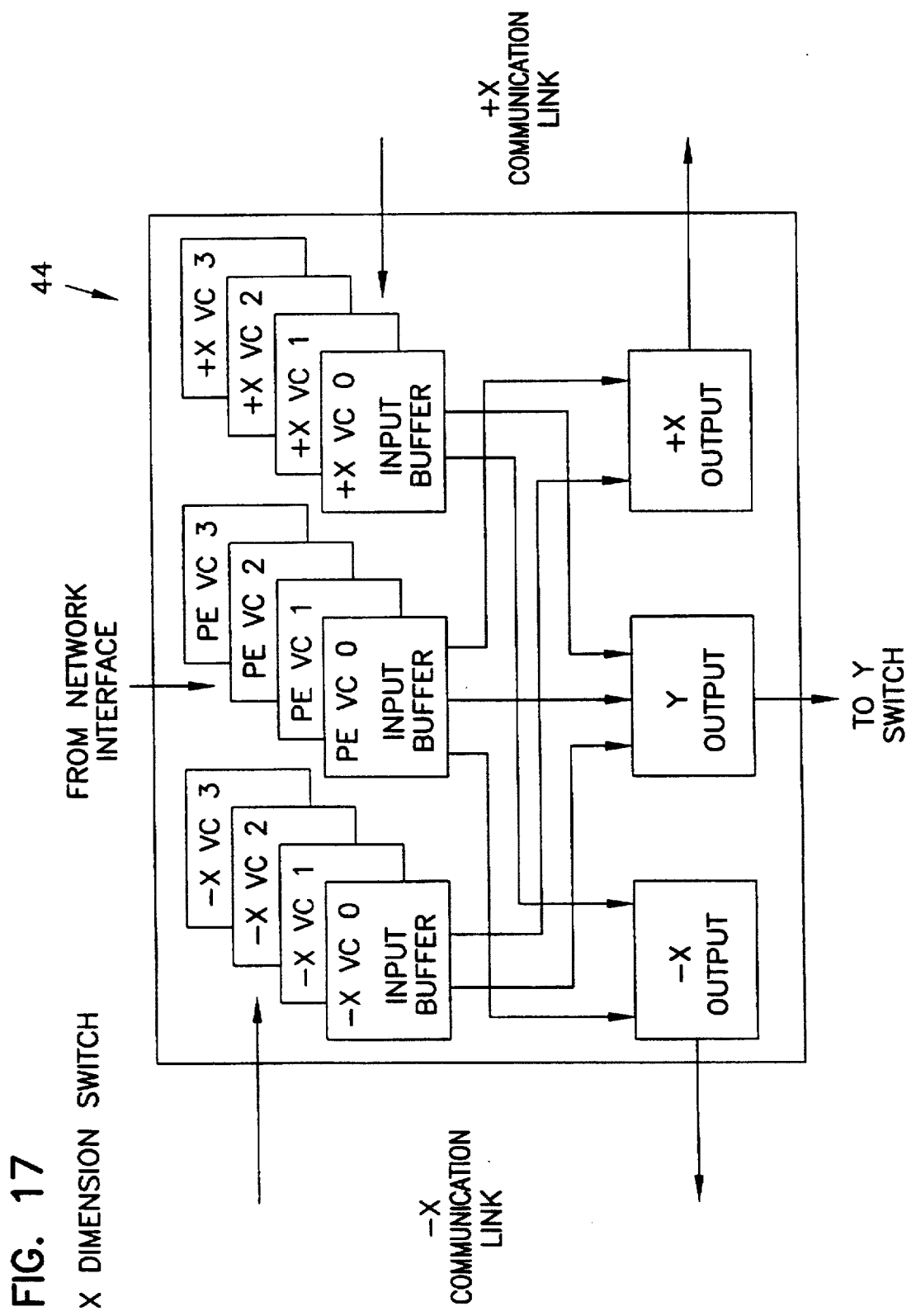
FIG. 17 is a diagram of an X dimension switch for an MPP system.

The X dimension switch controls the flow of packets through the X dimension communication links. Using the routing information in the packet and information received from the channel control signals, the X dimension switch steers packets from one X dimension communication link to the other, or from one X dimension communication link to the Y dimension switch. FIG. 17 shows the flow of packet information through the X dimension switch.

Each packet contains routing information. The packet routing information contains the two's compliment of the number of hops the packet will make in each direction and indicates the direction the packet will travel in each dimension. Immediately after receiving the first phit of a packet header, the X dimension switch reads the value stored in the X dimension portion of the packet routing information. If the value is not zero, the X dimension switch increments the value by one and sends the packet out on an X dimension communication link. If the value is zero, the X dimension switch sends the packet to the Y dimension switch.

The X dimension switch contains virtual channel buffers to separate requests and responses. The channel control signals in the communication links control which virtual channel buffer stores the packet information. Each buffer can store up to eight 16-bit parcels. The Y and Z dimension switches function identically to the X dimension switch. The Y and Z dimension switches transfer packets over the Y and Z dimension communication links, respectively.

Figure 18:
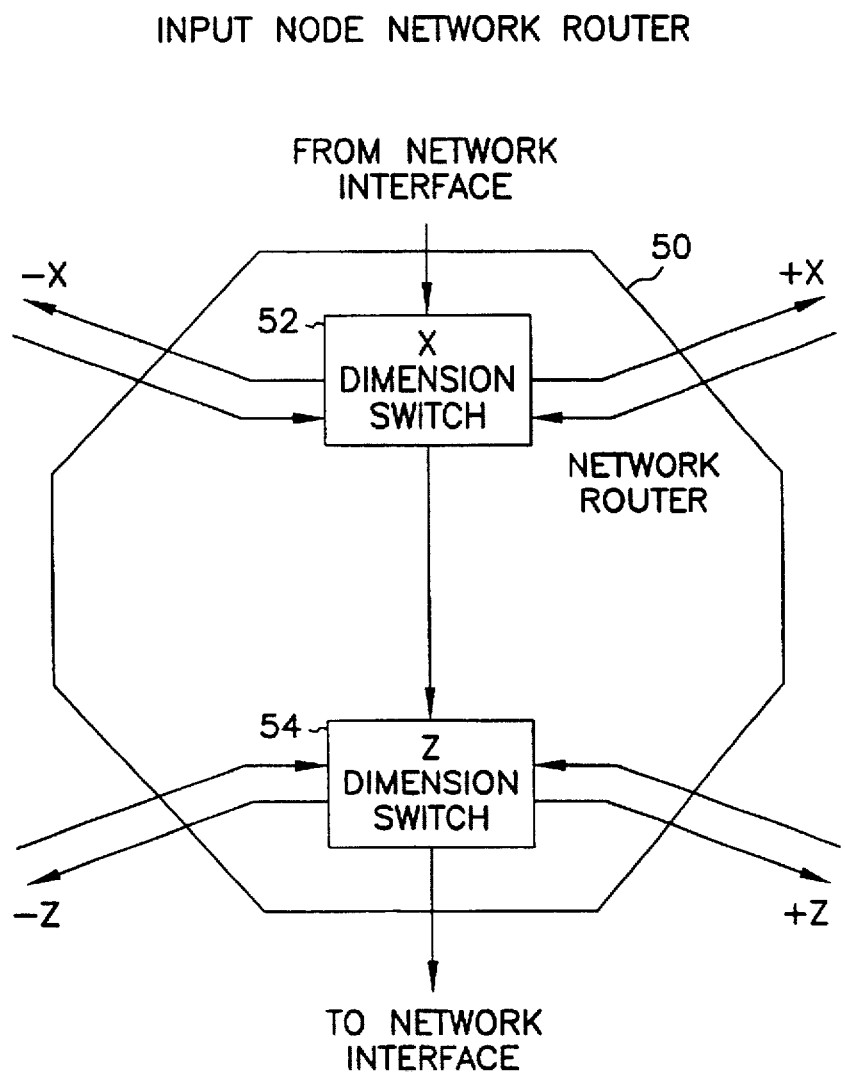
FIG. 18 is a diagram of an input node network router for an MPP system.

The I/O gateway network routers operate similar to the processing element node network routers; however, the I/O gateway network routers do not contain a Y dimension switch. FIG. 18 shows the components of the input node network router 50, which includes an X dimension switch 52 and a Z dimension switch 54. The two network routers for an I/O gateway are connected to each other. The +X and +Z communication links from the input node network router connect to the output node network router. The –X and –Z communication links from the output node network router connect to the input node network router.

I/O GATEWAYS

I/O gateways transfer system data and control information between the host system and the MPP system. The I/O gateways connect to the interconnect network through network routers that have communication links in the X and Z dimensions only. An I/O gateway can transfer information to any processing element in the interconnect network.

Figure 19:
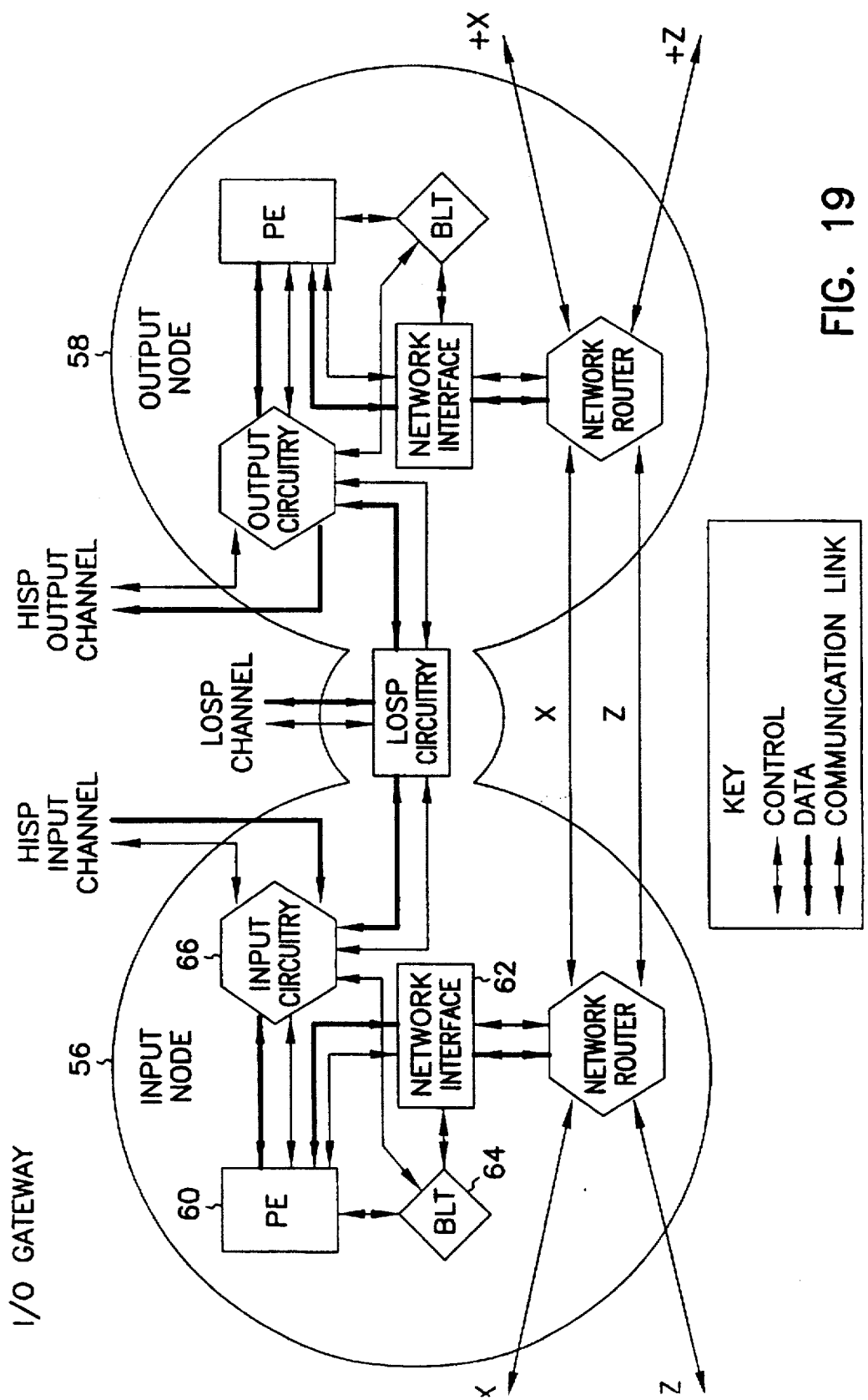
FIG. 19 is a diagram of an I/O gateway for an MPP system.

An I/O gateway preferably contains an input node, an output node, and low-speed (LOSP) circuitry. FIG. 19 shows the components of an I/O gateway. Input node 56 typically contains one processing element 60, a network interface 62, a block transfer engine 64, and high-speed (HISP) input circuitry 66. The BLT and network interface in the input node are identical to the BLT and network interface used in the processing element node.

The PE in the input node is designed to interface with the HISP input circuitry. Because of this characteristic, the PE in the input node does not contain the circuitry to perform all of the operations that a PE in a processing element node does. Instead, the circuitry is replaced with circuitry that interfaces with the HISP input circuitry. In addition, the PE in the input node contains half of the local memory that a PE in a processing element node has.

The PE in an I/O gateway does not perform the following functions and operations. More information on these functions and operations is provided in Section 2, "Addressing" and Section 3, "Operations": Incoming or outgoing atomic swap operations; Data prefetch operations; Read-ahead operations; Data cache-line invalidation; and, Virtual PE numbers and associated virtual PE range check.

The HISP input circuitry receives incoming system data from the host system over the HISP channel. After receiving the data, the HISP input circuitry, PE, and BLT in the input node transfer the data to the PEs in the CRAY T3D system. Except for the HISP output circuitry, the output node is identical to the input node. The HISP output circuitry transmits outgoing system data to the host system over the HISP channel. After the PE, BLT, and HISP output circuitry in the output node retrieve data from the PEs in the CRAY T3D system, the HISP output circuitry transfers the data to the host system. The LOSP circuitry transfers request and response information over the LOSP channel that connects the host system and the CRAY T3D system. LOSP request and response information is used to control the transfer of system data over the HISP channel.

There are two types of I/O gateways: a master I/O gateway and a slave I/O gateway. The two types of I/O gateways correspond to the two types of components connected by a HISP channel. The master I/O gateway is the master component of a HISP channel and sends the address information to the host system during a HISP transfer. The slave I/O gateway is the slave component of a HISP channel and receives the address information form the host system during a HISP transfer.

CLOCK

The MPP system contains a central clock that provides, for example, a 6.67 ns clock signal. The clock signal is fanned-out to all of the processing element nodes and I/O gateways in the system. The clock resides on one circuit board in the MPP system cabinet.

NETWORK ARBITRATION

Figure 20:
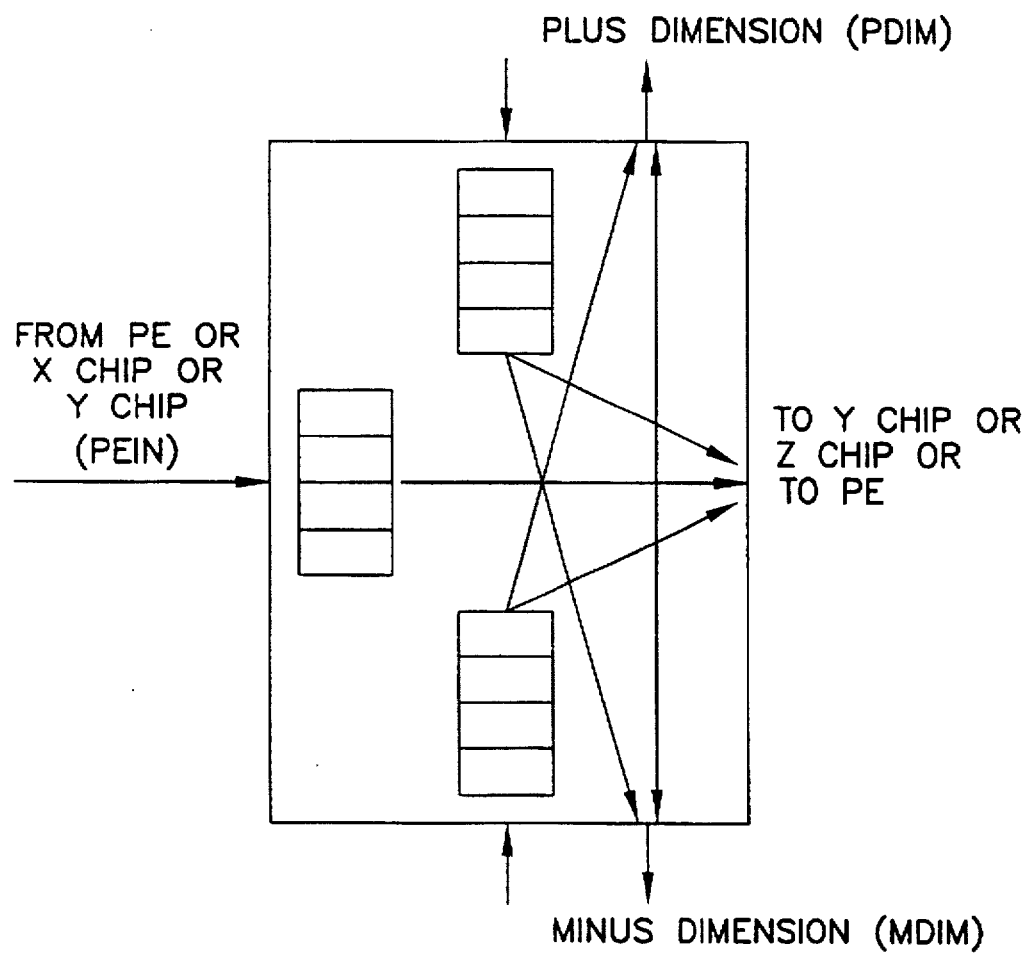
FIG. 20 is a diagram of data paths through each dimension switch logic.

Each dimension switch logic preferably has 3 input channels and 3 output channels. Each input channel is physically two bytes wide and logically, supports four virtual channels. Two virtual channels (0 and 1) are for request packets and two of the virtual channels (2 and 3) are for response packets. Each dimension switch logic handles one dimension of one node. FIG. 20 illustrates data paths for each dimension switch logic.

Each dimension switch logic has one five bit counter to arbitrate between input channel conflicts and conflicts between virtual channels. The lower two bits determine which virtual channel has priority and the upper two bits determine which input channel has priority. Data passing through each dimension switch logic can pass through in one clock period by using the RAM bypass mode if no conflicts are encountered. If a conflict exists, the packet data is read from the RAM cell.

All four virtual channels preferably reside in one 32×16 RAM cell. Each dimension switch logic preferably has three RAM cells, one for each input channel. The virtual channel address for the RAM cell must be determined the proceeding clock period. Because of limitations in the number of gates and optimizations for the bypass mode, no conflict checking is completed as the RAM address is selected. Only virtual channels with valid references are selected. Because of the lack of conflict checking as the RAM address is being selected, the priority counter must be kept counting to cycle through all the valid reference requests. If the priority counter were to stop and hold until the selected virtual channel proceeded, the other three virtual channels would also be stopped.

Thus, the counter normally free runs which maximizes the network throughput. A random number generator periodically disables priority counters for each dimension switch logic. Disabling the priority counters in a random fashion was added to prevent packets from being stalled (livelocked) because of a cyclic pattern between the other input channels or virtual channels. Tables 4 and 5 illustrate the channel priority based on the counter value for each dimension switch logic.

TABLE 4

Virtual Channel Priority-Counter Bits 1 and 0
Highest Priority

| 00 | 01 | 10 | 11 |
|----|----|----|----|
| 0  | 3  | 2  | 1  |
| 1  | 0  | 3  | 2  |
| 2  | 1  | 0  | 3  |
| 3  | 2  | 1  | 0  |

TABLE 5

Input Channel Priority-Counter Bits 4 and 3
Highest Priority

| 00   | 01   | 10   |
|------|------|------|
| PEIN | MDIM | PDIM |
| PDIM | PEIN | MDIM |
| MDIM | PDIM | PEIN |

Figure 21:
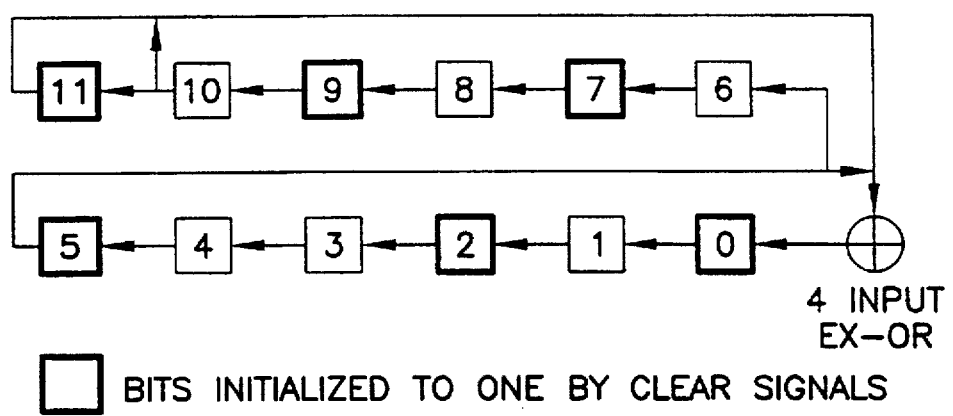
FIG. 21 is a diagram of logic for a random number generator.

The random number generator is preferably implemented with a 12 bit linear feedback shift register based on the primitive polynomial: $x^{12}+x^6+x^4+x+1$. In addition to the 12 bit pseudo-random number generator, a free running 5 bit counter can be used. When the free running counter bits match bits 0, 2, 4, 8, and 10 of the random number generator, a new random number is generated and 1 clock period priority counter disable pulse is generated for each dimension switch logic. The random number generator repeats once every 4095 times it is incremented. FIG. 21 illustrates a preferred random number generator logic implementation.

The output of the random number generator combined with the 5 bit free running counter was simulated. The output pattern repeats once every 67,552 clock periods.

Each dimension switch logic typically must receive a unique random number generator disable pulse to ensure there are no dependencies between network switch logic. This is accomplished by staggering the starting clock period of each node's random number generator and having three separate taps for each switch logic (i.e. X, Y, Z logic) within each node.

VIRTUAL CHANNEL ALLOCATION

The following describes an MPP system virtual channel allocation and its impact on intercommunication network performance. The primary purpose of virtual channels is to eliminate deadlock, but they can also increase available network bandwidth since they provide more opportunities for messages to pass blocked messages. The present specification discusses the overall problem of virtual channel allocation on an MPP system, and shows that improved channel allocation can reduce the execution time of a particular application that produces random network traffic by 24%. The present specification introduces criteria to evaluate a given allocation, and allocation algorithms that try to meet these criteria. The present specification also shows that a partitioned-allocation algorithm performs the best of the known algorithms for both random and partitioned-random network workloads. Since these optimizations can be implemented entirely in software-filled routing tables, they could be incorporated directly into an MPP system software.

Introduction

The following description focuses on the problem of virtual channel allocation for an MPP system. A key component of an MPP system is the intercommunication network. While it has high-bandwidth, the speed of many applications and many system operations will still be dominated by the intercommunication network performance. Any sustained increases in network performance will surely improve overall system performance. The present specification discusses software virtual channel allocation techniques that can utilize the full capabilities of the available MPP system hardware network.

A three-dimensional MPP system interconnect is a 3D torus; essentially the physical channel connections form a cube with the ends connected together. There are buffers at the destination of each physical channel in the network to receive data arriving along the physical channel. The buffer space is statically partitioned between different virtual channels; only messages using the virtual channel can use the buffer space allocated to the virtual channel. The primarily purpose of these virtual channels is to prevent network deadlock. Without virtual channels, all messages following a blocked message may also be blocked, waiting for buffer space to become available. With virtual channels and their corresponding buffer space, some messages may be able to pass other blocked messages. This is the key feature that allows virtual channels to avoid deadlock. It also leads to higher physical network channel utilization. Buffer space that otherwise might have been uselessly tied up by a blocked message can instead be available to other messages in other virtual channels.

The present specification discusses the virtual channel allocation problem as it appears in an MPP system. The present specification shows an example where optimized virtual channel allocation reduces the execution time of a workload requiring random communication by 24%. The present specification also discusses some criteria to evaluate virtual channel allocation, develop some algorithms that try to meet the criteria, and show the performance implications of the alternative allocation algorithms. The present specification finds that a partitioned-allocation algorithm outperforms several other known algorithms for both random and partitioned-random workloads. Since an MPP system routing tables are filled by software, optimizations described in the present specification can be directly applied to an MPP system software.

Interprocessor Network Interconnect and Buffering

Figure 22:
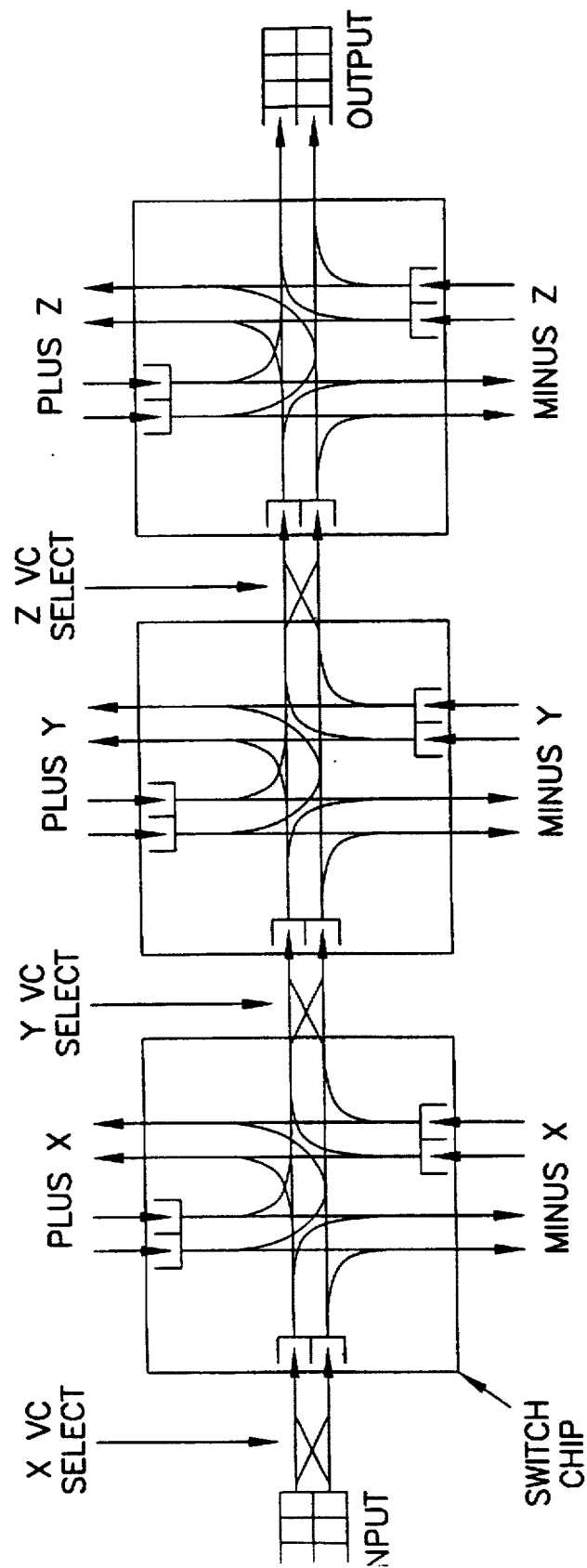
FIG. 22 is a diagram of buffers in an MPP system.

FIG. 22 depicts the layout of the buffers in an MPP system network for either requests or responses. FIG. 22 shows two virtual channels per physical channel. On a preferred system, there are actually four virtual channels per physical channel, two each for requests and responses. Since the buffer configuration and the message routing is identical and separated for both requests and responses, the present specification considers each separately here. Three identical switch chips, one for each of the three dimensions, route the messages from the source to the desired destination. These chips implement dimension-order routing for the X, Y, and Z dimensions of the torus; first, a message travels through the X chips in the plus or minus X direction, then it travels through the Y chips in the plus or minus Y direction, and it travels along the Z dimension to reach the desired destination. Routing tables that are loaded by software determine the distance, virtual channel, and direction a message travels along each dimension to reach each destination. As a message travels through the network, it consumes buffer space. When a message arrives and buffer space has already been taken, the message blocks until the buffer space becomes available.

Two processors share a network interface on an MPP system. The two input buffers at the far left of FIG. 22 are dedicated, one for each processor. As a message enters the network from the input buffers, it enters one of the two X dimension virtual channel input buffers. When it travels along a dimension, it stays in the same virtual channel but as it crosses over from one dimension to another it switches virtual channels, based on the virtual channel selected by the routing table for the new dimension. FIG. 22 shows that a message enters the virtual channel for a dimension at each switch chip crossing (X, Y, and Z VC select). As a message comes off the network out of the Z dimension chip, it enters one of the two output buffers. Unlike the input buffers, the output buffers are shared by the two processors. A message is stored in the same output buffer as the virtual channel it used while traversed the Z dimension.

Virtual Channel Deadlock Avoidance

Deadlock can occur when there are circular dependencies among held in the network buffers. For instance, this situation could cause a deadlock; a message in buffer zero is waiting for space in buffer one, the message in buffer one is waiting for space in buffer two, . . . , the message in buffer i is waiting for space in buffer zero. This circular situation could occur particularly easily in an MPP system because all dimensions are connected in a torus (or circle).

An MPP system interconnect scheme avoids cyclic deadlock in several ways. First, dimension-order routing allows the dimensions to be treated independently. The ordering of the dimensions ensures there can be no cycles that cross the dimensions since an ordering of the buffers in the different dimensions implies there can be no cycles. Provided the buffering within a dimension is deadlock-free, the entire interconnect will be deadlock-free. Second, deadlock due to the torus connection in both the plus and minus directions on each dimension can be avoided through proper use of the two virtual channels provided with each dimension. Note that only the buffers for the vertically-traveling physical channels shown in FIG. 22 can participate in a cycle. Buffer dependencies involving the horizontal ones cannot be cyclical because of the dimension ordering. Likewise, the plus-traveling buffers cannot participate in a cycle with the minus traveling buffers since a message can only travel in one direction on each dimension. Third, deadlock due to the interaction of requests and responses is avoided since the buffer space for requests and responses in independent. The progress of requests depends in the progress of responses (i.e. there are buffer dependencies between the request and response messages), so requests and responses must be allowed to travel independently through the network.

One technique to avoid buffer-allocation cycles (and thus deadlock) on a dimension is to use a dateline. In MPPO, the dateline for each direction of each virtual channel is the point where the buffer dependency cycle gets broken. Since a message traveling through a single dimension in MPPO never switches virtual channels, each message must be pre-scheduled on a virtual channel so that it does not cross a dateline. Any message that would cross the dateline for virtual channel zero must use virtual channel one, and any message that would cross the dateline for virtual channel one must use virtual channel one zero. Both virtual channels must have their own dateline for each direction (plus or minus), and a message cannot cross both datelines. No messages cross the dateline for a virtual channel while traveling along that virtual channel, so there can be no buffer dependencies crossing the dateline and, consequently, there can be no circular dependencies along the torus of a dimension.

Figure 23:
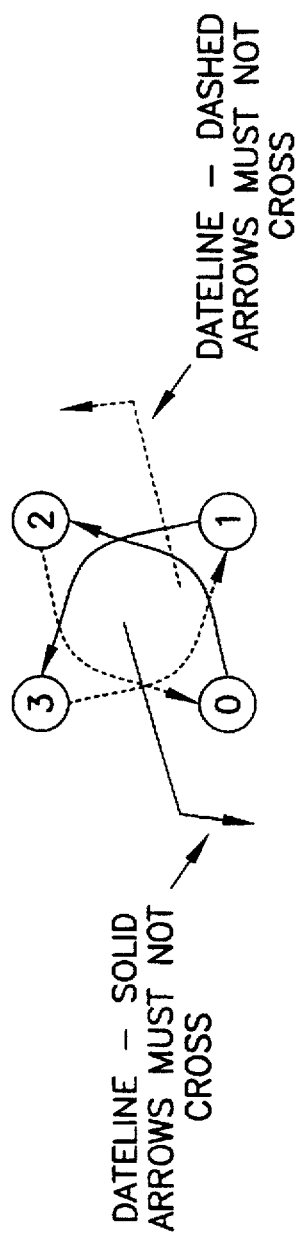
FIG. 23 is a diagram of dateline deadlock avoidance.

FIG. 23 depicts possible datelines for the counter-clockwise-traveling messages of a four-node torus. The physical channel connections between the nodes on the torus are not shown; if they were, each of the nodes would be connected to its two neighbors. Each arrow represents a possible message traversal along virtual channel zero of a dimension (solid) or virtual channel one of a dimension (dashed). The direction of the arrow indicates the path that the message would take. For instance, the arrow from node zero to node two passes near node one to indicate that message taking this path would physically first travel from node zero through node one to its destination. Buffer dependencies can occur along the path of each possible arrow (message). Buffer dependency paths connect together when two arrows of the same type overlap. For instance, since the two solid arrows overlap, there are buffer dependencies form node zero to node three. The virtual channel allocation shown in FIG. 23 avoids deadlock because neither virtual channel zero nor virtual channel one can have circular buffer dependencies. The datelines break all cycles.

Though FIG. 23 shows the datelines lying between two nodes, the dateline can be placed in the middle of a node. All that is required is that buffer dependencies do not cross the dateline. Datelines leave considerable flexibility to virtual channel allocation. Provided an arrow does not cross either dateline, either virtual channel can be used (it is unconstrained).

Virtual Channel Allocation Performance Effects

An MPP system simulator can be used to evaluate the performance effects of alternative virtual channel allocation strategies. The simulator accurately models crucial MPP system performance features, in particular the network buffering as shown in FIG. 22. An implementation of a naive virtual channel algorithm based on the dateline rule is depicted on the left in FIG. 24. Unlike FIG. 23, it is complete since it shows all the arrows traveling in each direction. It also shows all four datelines, one for each direction of each of the two virtual channels. Each node had four outgoing arrows (one to each of the possible destinations for a message: the other three nodes and itself) and four incoming arrows. Each arrow is a minimal distance path to the dimension (in the event of a tie, the direction is arbitrarily selected). The naive allocation uses virtual channel zero unless an arrow crosses its dateline, and the datelines for virtual channel zero are positioned between nodes zero and three while the datelines for virtual channel one are between nodes one and two. The performance of this allocation is compared to the optimized allocation on the right. Note that all the optimized arrows travel the same distance and direction as the naive allocation, only their color changes. The difference between the naive and optimized allocations is the positioning of the datelines, and the coloring of the unconstrained arrows.

The results in Table 6 show that the optimized routing reduced the execution of time of the 128 processor (4×4×4) update loop, which in this case requires random network traffic, by 24%. The update loop performs the operation Y[X[i]]+Z[1] over the range of i's, where the X and Z arrays are local and the Y array is distributed across all processors. The implementation swap null values in the Y array entry (full/empty type synchronization), does the floating point increment, and then refills the Y array entry with the updated value. The X array is initialized with random data so the updates generate random interprocessor communication traffic. In this case, there was little contention among processors for the same Y array entries. Given that there is potentially a large performance improvement from optimized virtual channel allocation (at least 24%), a more careful look at the virtual channel allocation problem was taken in order to develop performance improving optimizations for other situations.

TABLE 6

Virtual Channel Performance Experiment
Relative Update Loop Execution Times

| Allocation  | Min  | Max  |
|-------------|------|------|
| Naive       | 0.89 | 1.50 |
| Optimized   | 1.00 | 1.16 |
| Improvement |      | -24% |

Table 6 compares the performance of the naive and optimized virtual channel allocations shown in FIG. 24. Relative execution times of an implementation of the update loop are displayed. The network workload is characterized by many small messages to random destinations. The simulation is of a 4×4×4 system, with all 128 processors executing the update loop. The "Min" column gives the time for the first processor to complete and the "Max" column gives the time for the last processor to complete. It can be determined that the essential problem with the naive option by just a cursory examination of FIG. 24 and Table 6. From FIG. 24 it is clear that virtual channel zero is used much more heavily than virtual channel one in the naive version. For instance, both nodes one and two have no outgoing arrows, and there are no dashed arrows that traverse the physical channel between them. This imbalance leads to the relatively poor performance of the naive solution.

It has been verified that with naive allocation the slowest processors in the 128 processor simulation were the ones that were either node one or two (as in FIG. 24) in all three dimensions. The over-use of virtual channel zero by processors one and two resulted in many more buffer conflicts. Consequently, these two nodes tended to run slower than the others with the naive allocation. When work is distributed statically across processors, the worst-case time it takes to complete the work will determine system performance. Even though each processor was assigned an equivalent amount of work, the slowest processors required almost 70% more time to complete with the naive allocation. The performance improvement of the optimized allocation comes largely because all of the processors complete at approximately the same time ("Min" and "Max" are similar). The differential between the mean completion times with the naive and optimized versions is only 8%, much smaller than the 24% difference when all processors must complete. From this example it can be seen that it is important that the virtual channel allocation be "fair" to all processors, so that all of them can complete the same amount of work in approximately the same amount of time. Otherwise, system performance may be dictated by the speed of the slowest processors.

Virtual Channel Allocation Algorithms

All virtual channel allocations must avoid deadlock. Otherwise, the key factor that determines the goodness of a particular virtual channel allocation (like the ones shown in FIG. 24) is: for any given physical connection in FIG. 22, both virtual channel zero and one should be equally utilized. Provided there is random network traffic, each arrow shown in FIG. 24 can be considered to carry approximately the same number of messages, and the utilization of a buffer will be proportional to the number of arrows that pass through it. By equalizing the number of arrows of each type coming out a node, utilization of the horizontal input buffers of the switch chips shown in FIG. 22 are equalized. By equalizing the number of arrows of each type passing in each direction between nodes, the utilization of the vertical buffers is equalized. Finally, the output buffer utilization can be equalized if, for the Z dimension only, the number of arcs entering each node are equalized. In summary, if a system equalizes the number of each type of arrow entering, leaving, and traveling in each direction between all nodes, the system will achieve virtual channel buffer utilization for a random workload.

Given these equalization criteria, the improvements can be better quantified of the optimized allocation shown in FIG. 24. For the naive allocation, nodes one and two have only sold arrows leaving them, and several of the physical channels have no dashed arrows traveling along them. This means that with the naive allocation many of the virtual channel one buffers are unused. Instead, the virtual channel zero buffers are used twice as often. On the other hand, the optimized allocation on the right meets the equalization criteria perfectly. There are exactly two arrows of each type entering and leaving each node, and there are exactly one of each type for each physical channel. (Actually, each optimized arrow has its own dedicated buffer space in the plus and minus directions).

Unfortunately, sometimes the deadlock and buffer use equalization criteria are conflicting. Though the optimized allocation in FIG. 24 was able to successfully balance deadlock avoidance and virtual channel path equalization, for a larger torus perfect equalization typically becomes impossible with only two virtual channels because the datelines become more restrictive. The present specification also describes some virtual channel allocation algorithms that are successful in meeting the equalization criteria to varying degrees. (They all meet the deadlock-free criteria, though).

Figure 25:
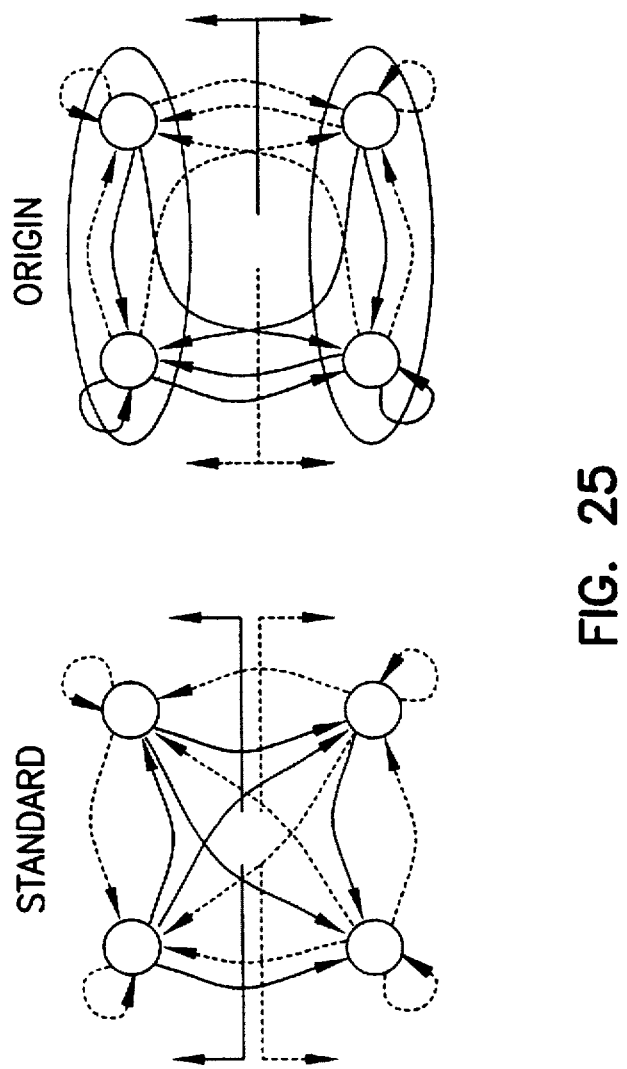
FIG. 25 is a diagram showing an example of standard and origin allocation.

One virtual channel allocation technique considered is a minor variant of the naive allocation shown in FIG. 24. This allocation is called the standard one; it is depicted in FIG. 25. All arrows that go in the negative direction are as in the naive implementation (all negative-traveling arrows use virtual channel zero unless they cross the dateline). All arrows that go in plus direction use the opposite virtual channel zero unless they cross the dateline). All arrows that go in the plus direction use the opposite virtual channel that the naive solution would use. (All length zero arrows travel in the plus direction). In effect, the standard solution switches the position of the datelines. Rather than having the same dateline for both the positive and negative directions, the two directions can be treated independently. The result of the standard allocation is a better virtual channel mix than with the naive one; for instance, there are no longer any nodes that have all their outgoing arrows the same color.

Another virtual channel allocation alternative is called an "origin" allocation, an implementation of this is also shown in FIG. 25. The nodes on a torus are partitioned into contiguous halves, one above and the other below, as shown in FIG. 25. All the arcs that originate from one of the partitions are solid and all the arcs from the other partition are dashed, except that the arcs that go in the positive direction are inverted (the color of the length zero arcs equalizes the number of dotted and dashed arcs out of a node). In effect with origin allocation, the datelines for virtual channel zero and virtual channel one are at the edges of the partitions since an arrow does not pass out of one partition, into the other, and back into the first one. The improvement of original allocation over the naive allocation is larger the selection of the unconstrained arrows to more evenly balance the use of the two virtual channels. The placement of the datelines is effectively the same as with naive allocation.

Figure 26:
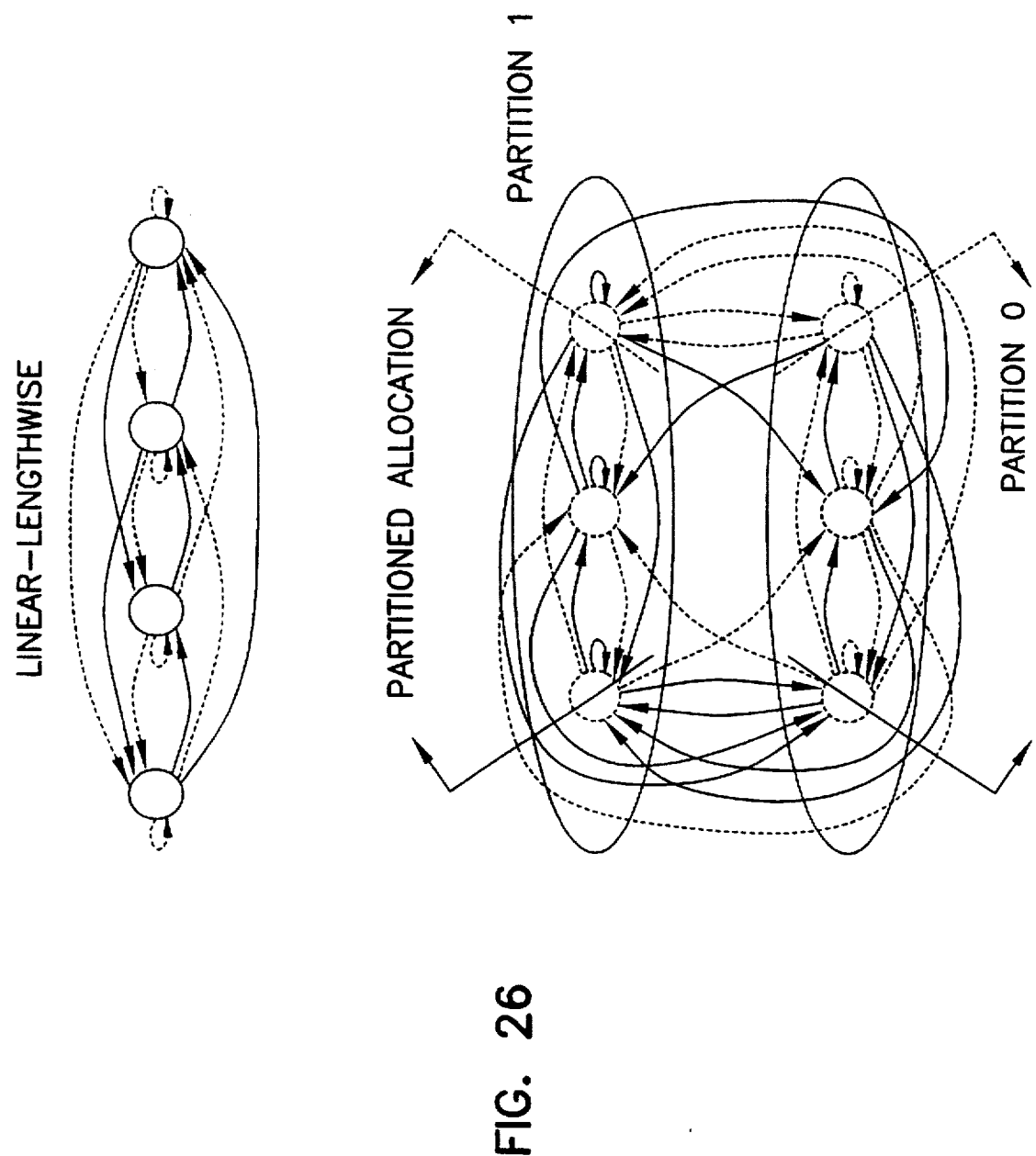
FIG. 26 is a diagram showing an example of linear-lengthwise and partition allocation.

Since is expected that the software often partitions an MPP system, with different partitions running different jobs, another scheme, called partitioned allocation, can be examined; a six-node allocation of this is depicted on the bottom in FIG. 26. As with origin, the system again partitions a dimension into halves, where each half contains the compute nodes that would be included in a partition of the dimension (plus also I/O and redundant nodes). Since messages within a partition will be more frequent than messages that cross the partition when software partitions a dimension, the system optimizes the arrows within a partition first, and pay less attention to the arrows that cross a partition. Since the system places the datelines near partition boundaries, within a partition there is complete freedom to allocate virtual channels. Linear-lengthwise allocation is used within a partition. This is depicted in the top part of FIG. 26. Essentially, with linear-lengthwise the system alternates between virtual channels, depending on the arrow length. The system must be careful about deadlock only for the arcs that cross partition boundaries. All the arcs that cross the partition boundary on the right (in either the plus or minus direction) are solid if they pass one or more nodes in the other partition, otherwise, they are dashed. Similarly, those that cross on the left are dashed if they pass one or more nodes in the other partition, otherwise, they are solid. The partitioned-allocation improves the virtual channel buffer utilization over the naive solution by both shifting the datelines, and by better unconstrained arrow allocation (particularly within a partition).

Allocation Alternative Performance Comparison

The present specification compares the standard, origin, and partition virtual channel allocation alternatives for the same random update loop workload previously used. They were also compared to a system with no torus connection and linear-lengthwise virtual channel allocation, and our original naive solution. In order to save simulation time, the system creates only one node along the X and Y dimensions of an MPP system simulator, and varies the number of nodes along the Z dimension. The Z dimension was selected since it is the one for which virtual channel allocation is most critical, given that allocation determines not only the switch chip buffer utilization, but also the output buffer utilization (as shown in FIG. 22). Simulations were run for Z dimensions with both 8 and 16 nodes (16 and 32 processors). Table 7 shows the results. To put the results in perspective, a similar experiment was performed with 8 processors in a 1×1×4 system to compare the naive and optimized version from FIG. 24. In that case, the optimized version decreased execution time by 6.6%. 6.6% is less than a third of the 24% execution time reduction with a 4×4×4 system. Thus one can expect the performance differences between the alternatives to be considerably larger than those in Table 7 (perhaps a factor of three larger) in a larger system that uses all three dimensions.

The results show that even though the partitioned algorithm was developed specifically for a partitioned workload rather than the random workload here, it outperforms all the other alternatives for the 16 processor case and performs equally or better for the 32 processor case. For the 16 processor case, it outperforms the naive, standard, and origin alternatives by 8–10%. For the 32 processor case, partition and origin perform similarly, and naive and standard perform relatively poorer. Naive and Standard only perform 10% better than the no torus case. This shows that a system without torus connections, but with good virtual channel allocation can almost match a torus with poor virtual channel allocation. With 32 processors, each processor does the same amount of work. The execution times approximately double because the number of hops each message must travel is approximately double that with 16 processors.

TABLE 7

Virtual Channel Allocation Performance Experiment (Random) Relative Update Loop Execution Times

| Processors | Algorithm | Min | Max |
|---|---|---|---|
| 16 | Naive | 1.03 | 1.24 |
|  | No Torus | 1.11 | 1.55 |
|  | Standard | 1.00 | 1.22 |
|  | Origin | 1.01 | 1.22 |
|  | Partition | 1.00 | 1.14 |
| 32 | Naive | 1.57 | 2.78 |
|  | No Torus | 1.41 | 3.04 |
|  | Standard | 1.57 | 2.77 |
|  | Origin | 1.64 | 2.37 |
|  | Partition | 1.43 | 2.37 |

Table 7 compares the virtual channel allocation alternatives described in the previous section for the update loop, as in Table 6. Shown are execution times (min and max) relative to the min time for the Partition algorithm with 16 processors.

Since partitioning may be another important attribute of an MPP system workloads, the present specification also compares results for a workload that has locality. The update loop was modified so that the random updates when only to the nodes within a partition. The results are shown in Table 8. They show that the partition and no torus algorithms perform similarly. This is not surprising since they both use linear-lengthwise virtual channel allocation. The results also show that they both outperform the other virtual channel allocation schemes for the partitioned workload, by over 10% with 32 processors. Given our potential factor of three difference, these 10% differences could lead to 30% (or more) differences in system throughput.

TABLE 8

Virtual Channel Allocation Performance Experiment (Local) Relative Update Loop Execution Times

| Processors | Algorithm | Min | Max |
|---|---|---|---|
|  | Naive | 1.12 | 1.19 |
|  | No Torus | 1.00 | 1.12 |
| 16 | Standard | 1.10 | 1.14 |
|  | Origin | 1.10 | 1.16 |
|  | Partition | 1.00 | 1.10 |
|  | Naive | 1.31 | 2.25 |
|  | No Torus | 1.41 | 2.00 |
| 32 | Standard | 1.32 | 2.24 |
|  | Origin | 1.23 | 2.26 |
|  | Partition | 1.39 | 1.99 |

Table 8 compares the virtual channel allocation alternatives for the update loop with locality. Shown are execution times (min and max) relative to the min time partition algorithm with 16 processors.

It is clearly undesirable for a system with torus connections to under-perform a system without a torus connections, as the results in Table 8 show. These results indicate the deadlock-avoidance handicap of the naive, standard, and origin virtual channel allocation strategies. When the machine is partitioned, the torus connection is not used with any of the routing schemes. But naive, standard, and origin still allocate virtual channels as if deadlock were a concern. If it were not for system messages that might cross partition boundaries, the system could update the routing tables each time a machine was partitioned in order to take advantage of the linear-lengthwise virtual channel allocation and remove the deadlock avoidance handicap of the torus. But in any case, the partitioned algorithm is typically a better solution. It provides a single virtual channel allocation algorithm that performs well in both that the partitioned and non-partitioned case, so there is no need to reload the routing tables dynamically because there is no deadlock avoidance handicap when the machine is partitioned.

Conclusion

The present specification has shown that, though the primary purpose of virtual channels is to avoid deadlock, virtual channel allocation can have a large impact on the available network bandwidth in an MPP system. Since intercommunication performance will undoubtedly be a large factor in the system performance of an MPP system, it is important to carefully allocate messages to virtual channels in order improve network performance.

The present specification described the virtual channel allocation problem as it applies to an MPP system. Then the present specification showed that optimized virtual channel allocation resulted in a 24% execution time reduction for an update loop workload characterized by random network traffic. Criteria was then developed that explains the performance differences for different virtual channel allocations. Essentially, the goal of virtual channel allocation should be to equalize the utilization of the two virtual channel buffers that receive the data off each physical connection. This is done by equalizing arrow counts for each physical connection.

Several algorithms were considered that attempt to meet this equalization criteria. One particular alternative, partitioned allocation, performed better than the other algorithms for both random and partitioned-random workloads. The software virtual channel allocation improvements in the present specification reduced execution times by 10% when only a single dimension was simulated. If all three dimensions were simulated, the performance improvements could easily be triple this.

The following references are incorporated herein by reference: W. J. Dally and C. L. Seitz, "Deadlock-Free Message Routing in Multiprocessor Interconnection Networks", IEEE Transactions on Computers, vol. 36, no. 5, May 1987, pp. 547–553; W. J. Dally, "Virtual-Channel Flow Control", IEEE Transactions on Parallel and Distributed Systems, vol. 3, no. 2, March 1992, pp. 194–205; R. Passint, MPP-0 Network Interconnect Description, November 1991; G. Thorson, MPP-1 Router Architecture and Implementation, July 1992.

While the present invention has been described in connection with the preferred embodiment thereof, it will be understood that many modifications will be readily apparent to those skilled in the art, and this application is intended to cover any adaptations or variations thereof. It is manifestly intended that this invention be limited only by the claims and equivalents thereof.

What is claimed is:

1. A multiprocessor computer system comprising:

a plurality of processing element nodes capable of executing more than one instruction simultaneously, each node including a processing element having a processor and a local memory, wherein globally addressable portions of local memory of each processing element form a distributed memory;

an interconnection network connecting together the processing element nodes in an n-dimensional topology, wherein n is at least two, the network comprising internode communication paths connecting each of the plurality of processing element nodes to adjacent processing element nodes, wherein the maximum interconnection distance between the processing element nodes is minimized by interleaving selected ones of the plurality of processing element nodes in at least one of the n dimensions; and a network router for transmitting messages between processing element nodes via the interconnection network.

* * * * *